United States Patent
Chen

(10) Patent No.: US 8,908,006 B2
(45) Date of Patent: Dec. 9, 2014

(54) METHOD, TERMINAL AND SYSTEM FOR CAPTION TRANSMISSION IN TELEPRESENCE

(71) Applicant: Huawei Device Co., Ltd., Shenzhen, Guangdong (CN)

(72) Inventor: Xianyi Chen, Shenzhen (CN)

(73) Assignee: Huawei Device Co., Ltd., Shenzhen (CN)

(*) Notice: Subject to any disclaimer, the term of this patent is extended or adjusted under 35 U.S.C. 154(b) by 154 days.

(21) Appl. No.: 13/711,485

(22) Filed: Dec. 11, 2012

(65) Prior Publication Data
US 2013/0100348 A1 Apr. 25, 2013

Related U.S. Application Data

(63) Continuation of application No. PCT/CN2011/075916, filed on Jun. 20, 2011.

(30) Foreign Application Priority Data

Jul. 13, 2010 (CN) .......................... 2010 1 0225014

(51) Int. Cl.
H04N 7/15 (2006.01)
H04N 7/088 (2006.01)

(52) U.S. Cl.
CPC ........... H04N 7/0882 (2013.01); H04N 7/0885 (2013.01); H04N 7/15 (2013.01)
USPC ................... 348/14.09; 348/14.08; 348/14.12

(58) Field of Classification Search
CPC . H04N 7/008; H04N 7/0882; H04N 21/4884; H04N 21/4316; H04N 7/147; H04N 7/15; H04N 7/152
USPC ............................................ 348/14.01–14.16
See application file for complete search history.

(56) References Cited

U.S. PATENT DOCUMENTS 5,764,901 A 6/1998 Skarbo et al.
6,771,302 B1* 8/2004 Nimri et al. ................ 348/14.08

(Continued)

FOREIGN PATENT DOCUMENTS

CN 1283931 A 2/2001
CN 1413028 A 4/2003

(Continued)

OTHER PUBLICATIONS

International Search Report in corresponding PCT Patent Application No. PCT/CN2011/075916 (Oct. 13, 2011).

(Continued)

*Primary Examiner* — Melur Ramakrishnaiah
(74) *Attorney, Agent, or Firm* — Leydig, Voit & Mayer, Ltd.

(57) ABSTRACT

Embodiments of the present invention disclose a method, terminal and system for caption transmission for telepresence, relating to the field of telepresence technologies and solving the problem that caption display on each display terminal cannot be coordinated in the prior art. Some embodiments include acquiring entire caption content and attribute information corresponding to the caption content; determining, according to the entire caption content and the attribute information corresponding to the caption content, caption content to be displayed on each display terminal and a display timing; and transmitting the determined caption content to each corresponding display terminal according to the display timing so that each display terminal superposes the determined caption content to an image.

11 Claims, 13 Drawing Sheets

(56) References Cited

U.S. PATENT DOCUMENTS

| | | |
|---|---|---|
| 2004/0189793 A1 | 9/2004 | Wang et al. |
| 2007/0143103 A1 | 6/2007 | Asthana et al. |
| 2008/0295040 A1 | 11/2008 | Crinon |
| 2009/0083639 A1 | 3/2009 | McKee Cooper et al. |

FOREIGN PATENT DOCUMENTS

| | | |
|---|---|---|
| CN | 1863278 A | 11/2006 |
| WO | WO 03/034734 A1 | 4/2003 |
| WO | WO 2008093270 A2 | 8/2008 |

OTHER PUBLICATIONS

Search Report in corresponding Chinese Patent Application No. 201010225014.5 (Feb. 25, 2013).

Written Opinion of the International Searching Authority in corresponding International Patent Application No. PCT/CN2011/075916 (Oct. 13, 2011).

* cited by examiner

METHOD, TERMINAL AND SYSTEM FOR CAPTION TRANSMISSION IN TELEPRESENCE

CROSS-REFERENCE TO RELATED APPLICATIONS

This application is a continuation of International Patent Application No. PCT/CN2011/075916, filed on Jun. 20, 2011, which claims priority to Chinese Patent Application No. 201010225014.5, filed on Jul. 13, 2010, both of which are hereby incorporated by reference in their entireties.

FIELD OF THE INVENTION

The present invention relates to the field of multimedia communication technologies, and in particular, to a method, an apparatus and a system for caption transmission in telepresence.

BACKGROUND OF THE INVENTION

The existing telepresence system generally uses multiple terminals binding multiple external devices (for example, multiple displays and multiple cameras) to construct a telepresence system. In this manner, the image picked up by each camera is coded by a corresponding terminal and then transmitted to a remote terminal. After receiving the remote code streams, the terminal decodes the code streams and output over the corresponding display. In this way, a life-size display may be implemented and the problem of eye-to-eye communication may be addressed to some extent.

In the telepresence system, captions may need to be displayed through a display. Currently, the modes for displaying captions includes the following two modes:

First, the caption transmission is implemented in the mode described in FIG. 1. An encoding end uses the captions are image content, directly superposes the captions to the image picked up by the camera, and then codes the image after superposition. In this manner, the captions exist on the actually coded image. Therefore, a decoding end only needs to decode the received code streams for display.

Second, the caption transmission is implemented in the mode described in FIG. 2. The encoding end uses the caption information as separate content and transmit the caption information and the image picked up by the camera to the decoding end. The decoding end superposes the received caption information and the decoded video code streams to the image, and displays the image after superposition.

During implementation of the above caption display, the prior art has at least the following problem: The above two modes for displaying the captions are only applicable to a telepresence system having a single terminal and a single image; multi-screen coordinated processing for the captions in the telepresence system cannot be implemented. During coordinated display of the captions on multiple displays, the displays must be set manually and content to be displayed on each display needs to be adjusted. Therefore, an overall coordination function for caption display cannot be implemented.

SUMMARY OF THE INVENTION

Embodiments of the present invention provide a method, terminal and system for caption transmission in telepresence.

The present invention adopts the following technical solutions:

A method for caption transmission in telepresence includes:

acquiring entire caption content and attribute information corresponding to the caption content;

determining, according to the entire caption content and the attribute information corresponding to the caption content, caption content to be displayed on each display terminal and a display timing; and transmitting the determined caption content to each corresponding display terminal according to the display timing so that each display terminal superposes the determined caption content to an image.

A method for caption transmission in telepresence includes:

acquiring entire caption content and a corresponding display mode of a display terminal, where the display mode is determined according to the entire caption content and the attribute information corresponding to the caption content;

determining caption content to be displayed and a display timing according to the display mode and the entire caption content; and superposing the determined caption content to an image according to the display timing.

A control device includes:

an acquiring unit, configured to acquire entire caption content and attribute information corresponding to the caption content;

a determining unit, configured to determine, according to the entire caption content and the attribute information corresponding to the caption content, caption content to be displayed on each display terminal and a display timing; and a transmitting unit, configured to transmit the determined caption content to each corresponding display terminal according to the display timing so that each display terminal superposes the determined caption content to an image.

A display terminal includes:

an acquiring unit, configured to acquire entire caption content and a corresponding display mode of a display terminal, where the display mode is determined according to the entire caption content and the attribute information corresponding to the caption content;

a determining unit, configured to determine caption content to be displayed and a display timing according to the display mode and the entire caption content; and a processing unit, configured to superpose the determined caption content to an image according to the display timing.

A system for caption transmission in telepresence includes:

a control device, configured to acquire entire caption content and attribute information corresponding to the caption content; determine, according to the entire caption content and the attribute information corresponding to the caption content, caption content to be displayed on each display terminal and a display timing; and transmit the determined caption content to each corresponding display terminal according to the display timing;

at least two display terminals, configured to receive the caption content and superpose the determined caption content to an image.

A system for caption transmission in telepresence includes:

a control device, configured to determine, according to entire caption content and attribute information corresponding to the caption content, caption content to be displayed on each display terminal and a display timing, and transmit the entire caption content and a display mode to each display terminal; and at least two display terminals, configured to acquire entire caption content and a corresponding display mode of a display terminal, determine caption content to be displayed and a display timing according to the display mode and the entire caption content, and superpose the determined caption content to an image according to the display timing.

During implementation of the method, terminal and system for caption transmission in telepresence according to the embodiments of the present invention, centralized control is performed according to the entire caption content and attribute information to determine the content to be displayed on each terminal or determine a display mode of each display terminal so that each display terminal displays the corresponding caption content. In this manner, the captions to be displayed and the display form do not need to be set for each display terminal. By using such centralized control mode, the caption to be displayed on each display terminal does not need to be separately laid out, which facilitates the layout of the caption. Each display terminal only needs to display the caption according to a centralized configuration of the control device, which simplifies the implementation mode of the caption display. In addition, because of the centralized configuration, the case that different captions are displayed on different display terminals at the same time is prevented, and caption error probability is reduced, and the caption negotiation capability between display terminals are enhanced.

BRIEF DESCRIPTION OF THE DRAWINGS

For a clearer description of the technical solutions of the present invention or the prior art, the accompanying drawings for illustrating the embodiments of the present invention or the prior art are described below. Apparently, such drawings illustrate only some exemplary embodiments, and persons of ordinary skill in the art can derive other drawings from such drawings without any creative effort.

DETAILED DESCRIPTION OF THE EMBODIMENTS

Captions are categorized into static captions and dynamic captions according to the display mode of the captions. The static captions do not change after being displayed while the dynamic captions may change during a display process, such as, rolling to the left, rolling to the right, blanking upward, or blanking downward. In addition, similar to a traditional telepresence system, in the telepresence system of the present invention, the application form of the captions includes, for example, an information prompt, a banner, and a manager text prompt. The embodiments of the present invention combine the feature that multiple terminals and control devices are included in the current telepresence system and the main application modes of the caption function to implement negotiation and processing of multiple captions. The technical solutions disclosed in embodiments of the present invention are described below with reference to embodiments and accompanying drawings. Evidently, the embodiments are exemplary only. Persons of ordinary skill in the art can derive other embodiments from the embodiments given herein without making any creative effort, and all such embodiments fall within the protection scope of the present invention.

Embodiment 1

In the system for caption transmission in telepresence provided in this embodiment, centralized caption processing is implemented through the negotiation of a control device, and each display terminal is responsible for receiving and displaying captions. In this embodiment, the control device may be an independent device terminal or functions of the control device may be integrated in the display terminal. Further, the control device may be implemented by a multi-point control server connected to a telepresence system through a transport network.

Figure 1:
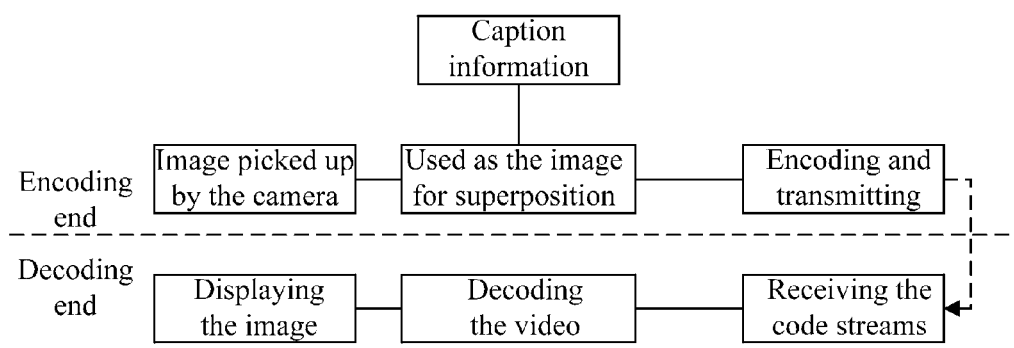
FIG. 1 is a schematic diagram of a system for local caption superposition according to the prior art.
Figure 2:
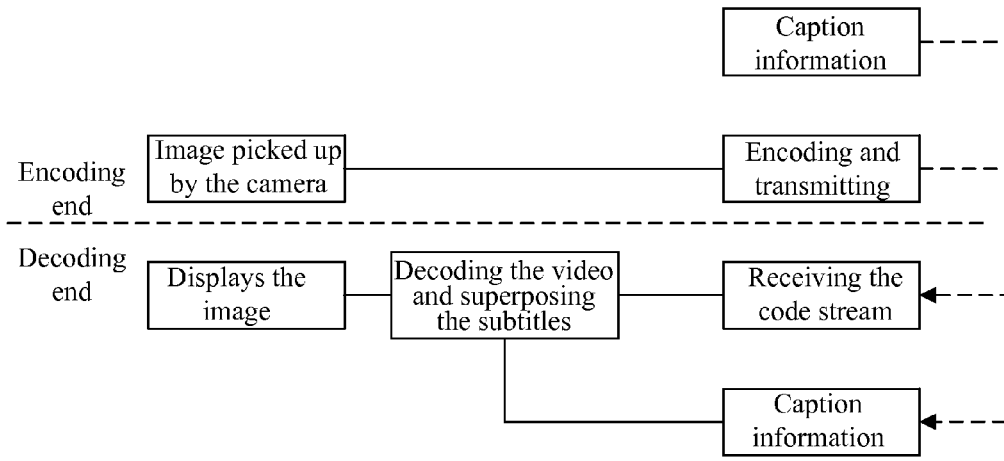
FIG. 2 is a schematic diagram of a system for remote caption superposition according to the prior art.
Figure 3:
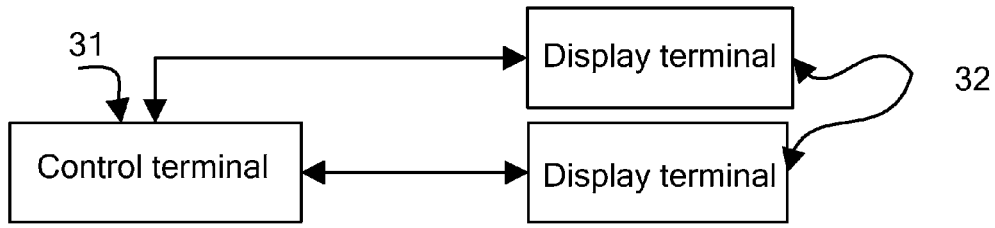
FIG. 3 is a block diagram of a system for caption transmission in telepresence according to Embodiment 1 of the present invention.

As shown in FIG. 3, a system for caption transmission in the telepresence system provided in this embodiment includes a control device 31 and at least two display terminals 32. The control device 31 is configured to: receive caption content and attribute information corresponding to the caption content, where the attribute information of the caption content mainly refers to display features, including but not limited to: color, font, size, static or dynamic motion, and specific motion mode; determine caption content to be displayed on each display terminal and a display timing according to the caption content and the attribute information corresponding to the caption content; and transmit the determined caption content to each corresponding display terminal according to the display timing. The display terminal 32 is configured to receive the caption content and superpose the determined caption content to an image. By using such centralized control mode, a caption to be displayed on each display terminal does not need to be separately laid out, which facilitates the layout of the caption. Each display terminal only needs to display the caption according to a centralized configuration of the control device, which simplifies the implementation mode of the caption display.

Figure 4:
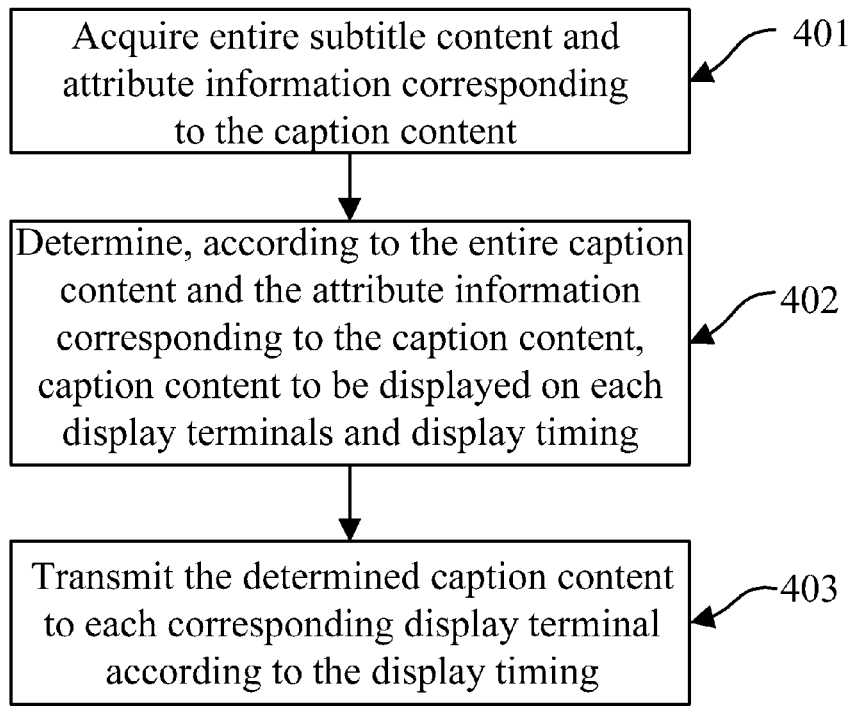
FIG. 4 is a flowchart of a method for caption transmission in telepresence according to Embodiment 1 of the present invention.

An embodiment of the present invention also provides a method for caption transmission in telepresence. As shown in FIG. 4, the method includes:

401. Acquire entire caption content and attribute information corresponding to the caption content. The entire caption content includes the caption content to be displayed on multiple display terminals in a telepresence system and the attribute information corresponding to the caption content mainly refers to display features, including but not limited to color, font, size, static or dynamic motion, and specific motion mode.

During specific implementation, the display features of a caption may be preset to default values, for example, the color feature is black by default, the font feature is SimSun by default, and the font size feature is three by default. In the description on whether the captions have the static or dynamic motion feature, a corresponding feature value may be used for characterization. When a caption is in motion, a specific motion mode needs to be used for characterization. A motion mode includes, but not limited to: moving to the left, moving to the right, moving upward, and moving downward. Other caption motion modes also fall within the scope of this embodiment.

402. Determine, according to the entire caption content and the attribute information corresponding to the caption content, caption content to be displayed on each display terminal and a display timing. In this step, the caption content to be displayed on each display terminal at each display timing needs to be determined. For a caption with the static attribution information, the actual content to be displayed on each display terminal needs to be determined in advance. In the case of a caption with the motion attribution information, the content corresponding to each display timing during a change process is included. For example, for a caption that rolls to the left, the time and rolling distance for each rolling may be determined. In this manner, the corresponding display timing after each rolling and the content after rolling to be displayed may be determined.

403. Transmit the determined caption content to be displayed on each display terminal to each display terminal according to the display timing so that each display terminal superposes the determined caption content to an image.

In step 402, the content to be displayed at each display timing is determined. Therefore, the display terminal only needs to superpose the received caption content to an image, to bring the corresponding motion effect, for example, rolling to the left, rolling to the right, and fading in and fading out. During the determination of the caption content to be displayed on each display terminal and the display timing, other features such as the font, size, and color of the caption content to be displayed on each display terminal may be further determined according to the attribute information, so that the display terminal displays richer captions.

It can be seen from the above embodiments that, the control device is configured to determine the content to be displayed on each terminal at different display timings according to the caption content and the attribute information corresponding to the caption content. In this manner, each terminal in the telepresence system is capable of displaying the corresponding caption information according to the caption content and a display timing delivered by the control device.

Figure 5:
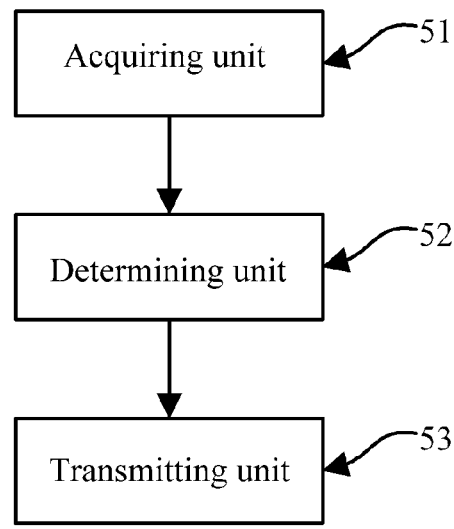
FIG. 5 is a block diagram of a control device according to an embodiment of the present invention.

The system according to this embodiment processes the captions in a centralized manner by using the control device to coordinate the terminals. The following describes the specific implementation of the control device. As shown in FIG. 5, the control device includes: an acquiring unit 51, a determining unit 52, and a transmitting unit 53. The acquiring unit 51 is configured to acquire entire caption content and attribute information corresponding to the caption content; the determining unit 52 is configured to determine, according to the entire caption content and the attribute information corresponding to the caption content, caption content to be displayed on each display terminal and a display timing; and the transmitting unit 53 is configured to transmit the determined caption content to each corresponding display terminal according to the display timing, so that each display terminal superposes the determined caption content to an image.

Figure 6:
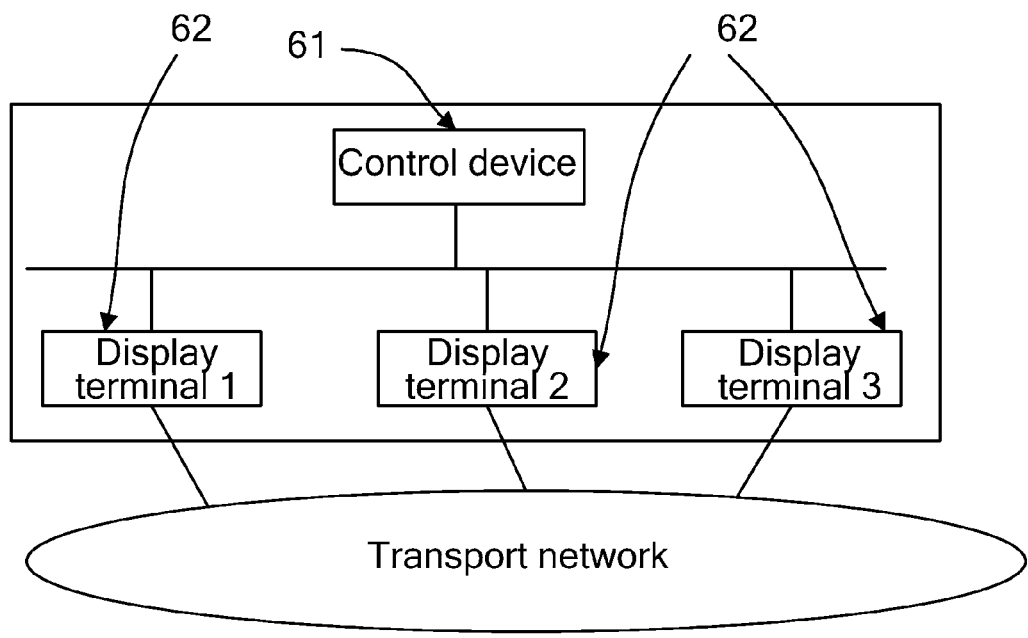
FIG. 6 is a block diagram of another system for caption transmission in telepresence according to Embodiment 1 of the present invention.

The following describes the solution that an independent control device is used as a control device as an example for description. As shown in FIG. 6, a control device 61 and at least two display terminals 62 compose a caption display system. In FIG. 6, three display terminals 62 are involved; the control device 61 and the three display terminals 62 are connected and the control device 61 directly controls the three display terminals 62; and the display terminals 62 complete related service processing (for example, coding and compression) and transmits the processed service to a remote terminal through a transport network. In this embodiment, the display terminal is another expression of a local terminal.

The control device 61 is configured to acquire entire caption content and attribute information corresponding to the caption content; determine, according to the entire caption content and the attribute information corresponding to the caption content, caption content to be displayed on each display terminal and a display timing; and transmit the determined caption content to each corresponding display terminal according to the display timing. The three display terminals 62 are configured to receive the caption content and superpose the determined caption content to an image. To acquire the entire caption content and the attribute information, the control device 61 according to the embodiments of the present invention is further configured to receive the entire caption content and the attribute information corresponding to the caption content directly input by a user. That is, the user may directly input the entire caption content and the attribute information corresponding to the caption content by using a local control device.

Figure 7:
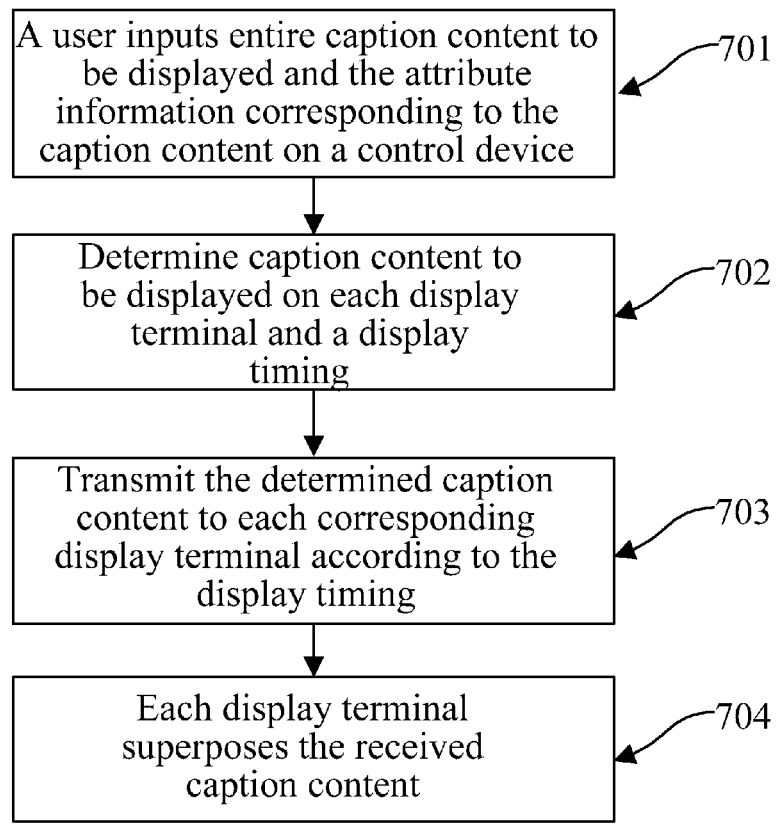
FIG. 7 is a flowchart of another method for caption transmission in telepresence according to Embodiment 1 of the present invention.

An embodiment of the present invention also provides a method for caption transmission in telepresence. As shown in FIG. 7, the method includes:

701. A user inputs, on a control device, entire caption content to be displayed, that is, inputs all captions to be displayed on three display terminals; and meanwhile, the user determines attribution information of the entire caption content by using the control device. Specifically, the user may input the attribute information corresponding to the entire caption by using the control device. The specific attribute information includes but not limited to:

whether the captions input by a user are local captions or remote captions; this embodiment uses the local captions as an example for description;

whether the captions input by a user are static captions or dynamic captions;

motion attribute information (for example, moving to the left) when the captions input by a user are dynamic captions;

other display attribute information of the captions input by a user, for example, color, size, and font.

Assume that in this embodiment, the entire caption content input by a user in the control device is: AxxxxxxAxxxxxx-ABxxxxxxBxxxxxxBCxxxxxxCxxxxxxC.

702. The control device processes the captions according to the entire caption content and the attribute information corresponding to the caption content input by the user, and determines the caption content to be displayed on each display terminal and the display timing.

The caption content and the display timing determined in the case of different attribute information may be different. The caption content and the display timing may be obtained by a corresponding calculation process.

Figure 8:
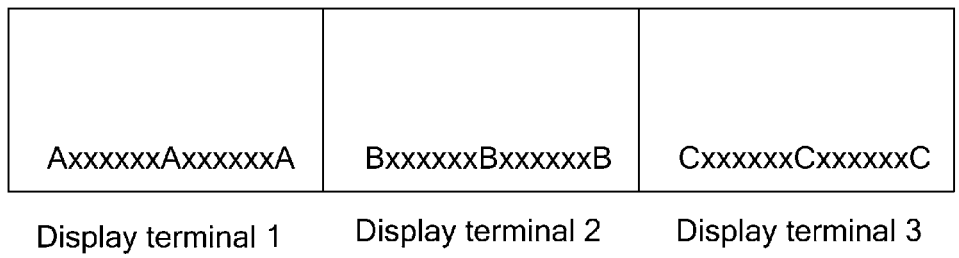
FIG. 8 is an effect diagram of static caption display according to Embodiment 1 of the present invention.

If the attribute information specifies static captions, the control device needs to determine, according to the entire caption content, specific captions to be displayed on each display terminal. For example, when the user inputs the entire caption content "AxxxxxxAxxxxxxABxxxxxx-BxxxxxxBCxxxxxxCxxxxxxC", assume that there are three local display terminals, as shown in FIG. 8, it may be set that display terminal 1 displays "AxxxxxxAxxxxxxA", display terminal 2 displays "BxxxxxxBxxxxxxB", and display terminal 3 displays "CxxxxxxCxxxxxxC". The above example describes a display mode in which the captions are evenly segmented and displayed. During specific implementation, the control device may also use the mode for unevenly segmenting the captions and determines the static caption content to be displayed on each display terminal.

Figure 9:
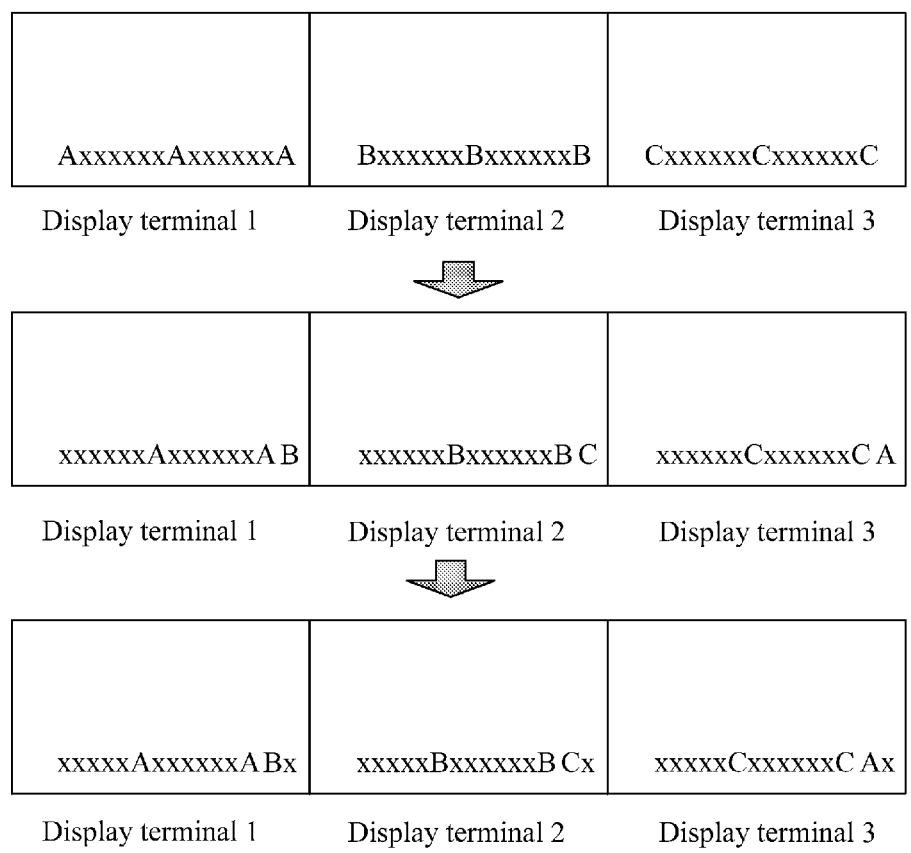
FIG. 9 is an effect diagram of dynamic caption display according to Embodiment 1 of the present invention.

If the attribute information specifies dynamic captions and the dynamic captions have a motion requirement indicative of rolling to the left, the control device, in addition to segmenting caption information, needs to implement real-time update according to a dynamic mode set by the user, and transmit updated information to each display terminal for processing. That is, for the dynamic caption displaying timing, the caption content corresponding to each display terminal needs to be determined. For the entire caption content, if the user requires the rolling to the left, when the caption information to be displayed is input, the caption content to be displayed on the three display terminals at each display timing is shown in FIG. 9, and the control device needs to determine the display timing and caption content according to FIG. 9.

The specific calculation process may use but not limited to the following method: Assume that a telepresence system includes three display terminals and requires that captions display while rolling from right to left, the screen is cleared after each rolling is complete, the rolling speed is r characters/frame, the frame rate of the caption display is p frames/second, each screen is capable of displaying a maximum of K characters, the total length of the captions is L characters, and L≥3 K, then the time required for each rolling is: T=(L+3K)/(r×p), the display timing corresponding to each screen is: T1=K/(r×p); if S indicates the number of characters involved in the current rolling, then S=(t mod T)×(r×p); and the corresponding display is as follows:

(1) If S≥3 K, all the caption content displayed on the three display terminals is: 3 K characters (if fewer than 3 K, all remaining characters are displayed) starting from the location of S−3 K in the character string L; for the display terminal on the right, in this case, display on the two display terminals on the left needs to be satisfied first; if characters to be displayed are not enough, the display terminal on the right displays nothing.

(2) If S<3 K, all the caption content displayed on the three display terminals is: the first S characters in the character string L are displayed; for the display terminal on the right, in such case, display on the display terminal on the right needs to be satisfied first; if S<K, the display terminal on the right displays the first S characters in the character sting L; if S<2 K, the display terminal on the right displays the K characters starting from the location of L−(S−K) in the character string L; if S>2 K, the display terminal on the right displays the K character starting from the location of L−(S−2 K) in the character string L.

703. The control device transmits the determined caption content to each corresponding display terminal according to the display timing. Data volumes to be transmitted in the case of the captions with different attribute information are different, which is described specifically as follows:

If the caption attribution information is set to the static captions, the captions are segmented according to 702. The control device transmits AxxxxxxAxxxxxxA to display terminal 1, and transmits BxxxxxxBxxxxxxB to display terminal 2, and transmits CxxxxxxCxxxxxxC to display terminal 3, and for the entire caption content that is input once, the control device only needs to transmit the data once.

If the caption attribute information is set to dynamic captions, the captions are segmented according to 702. The content transmitted to different display terminals at different timings is different. In the example illustrated in FIG. 9, the specific caption content is shown in FIG. 9. The caption content transmitted to display terminal 1 at display timing 1 is AxxxxxxAxxxxxxA, the caption content transmitted to display terminal 2 at display timing 2 is xxxxxxAxxxxxxAB, and the caption content transmitted to display terminal 3 at display timing 3 is xxxxxAxxxxxxABx. For display terminal 2, the caption content transmitted to display 2 at display timing 1 is BxxxxxxBxxxxxxB, the caption content transmitted to display 2 at display timing 2 is xxxxxxBxxxxxxBC, and the caption content is transmitted to display 2 at display timing 3 is xxxxxBxxxxxxBCx. For display terminal 3, the caption content transmitted to display 3 at display timing 1 is CxxxxxxCxxxxxxC, the caption content is transmitted to display 2 at display timing 3 is xxxxxxCxxxxxxCA, and the caption content is transmitted to display 3 at display timing 3 is xxxxxCxxxxxxCAx.

704. Each display terminal supposes the received caption content, that is, superposes the caption content on a corresponding image according to the display timing so as to display.

Local captions are used for description in the embodiments of the present invention. Therefore, only the local captions and the decoded images or video code streams to be displayed on a local terminal (that is, a local display terminal) need to be superposed.

According to the embodiments of the present invention, besides the processing of local captions, remote captions may also be processed. In this case, the caption content needs to be transmitted to remote display terminals according to the display timing. The remote display terminals superpose the caption content. That is, the remote display terminals use the received caption content as image content, superpose the caption content and the decoded video code streams to an image, and then display the image after superposition.

The modes used for transmitting the caption content to the remote display terminals are, but not limited to, the following implementation modes: Each local terminal transmits the caption content to a corresponding remote terminal according to the display timing, or one local terminal or control device transmits the caption content to the remote terminals according to the display timing.

During implementation of the method, terminal and system for caption transmission in telepresence according to the embodiments of the present invention, centralized control is performed according to the entire caption content and attribute information to determine the content to be displayed on each terminal or determine the display mode of each display terminal so that each display terminal displays the corresponding caption content. By using such centralized control mode, the caption to be displayed on each display terminal does not need to be separately laid out, which facilitates the layout of the caption. Each display terminal only needs to display the caption according to a centralized configuration of the control device, which simplifies the implementation mode of the caption display. In addition, because of the centralized configuration, the case that different captions are displayed on different display terminals at the same time is prevented, and caption error probability is reduced, and the caption negotiation capability between display terminals are enhanced.

Embodiment 2

The following describes the solution that an independent control device is used as a control device as an example for description. The control device and display terminals compose a system. The control device communicates with three display terminals. The control device is configured to receive entire caption content and attribute information corresponding to the caption content; and determine, according to the entire caption content and the attribute information corresponding to the caption content, caption content to be displayed on each display terminal and a display timing; and transmit the determined caption content to each corresponding display terminal. The three display terminals are configured to receive the caption content and superpose the determined caption content to an image. This embodiment differs from the embodiment illustrated in FIG. 7 in that the entire caption content and the attribute information corresponding to the entire caption content are transmitted by a remote terminal. The specific transmitting procedure and method can be referred to the process description illustrated in FIG. 10.

Figure 10A:
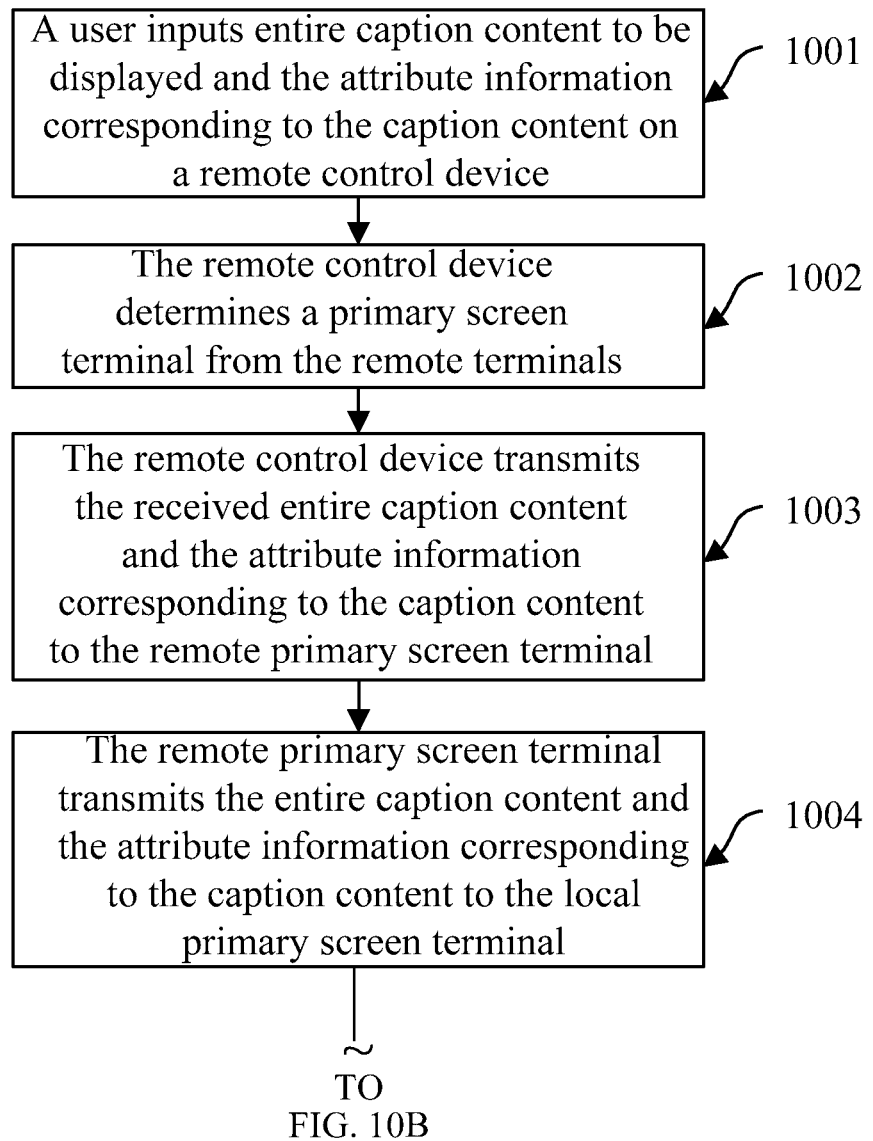
FIG. 10a and FIG. 10b are a flowchart of a method for caption transmission in telepresence according to Embodiment 2 of the present invention.
Figure 10B:
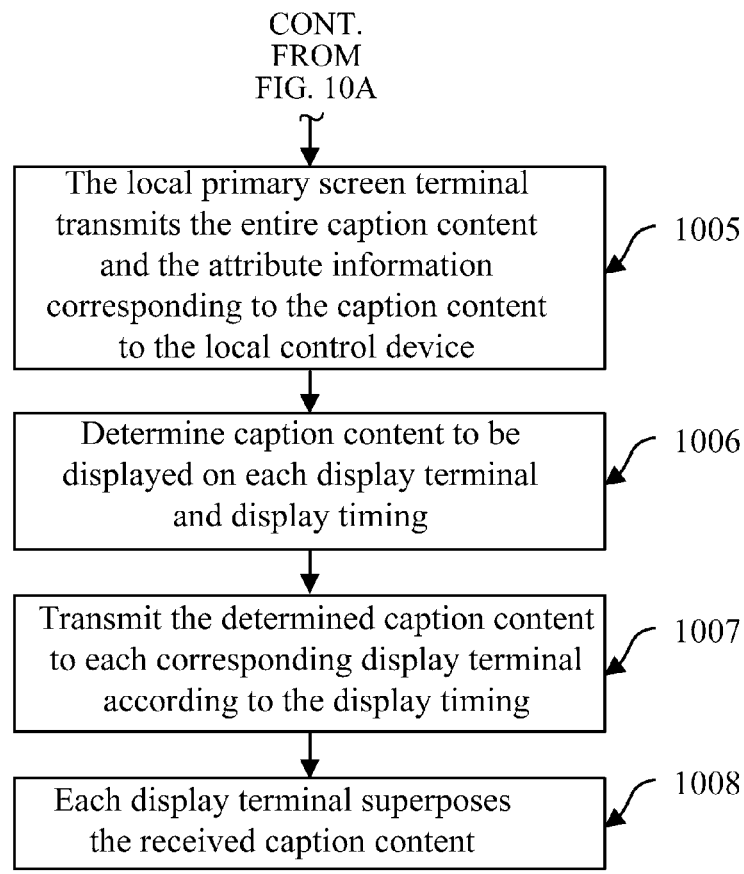

An embodiment of the present invention also provides a method for caption transmission in telepresence. As shown in FIG. 10, the method includes:

1001. A remote user inputs, on a control device, entire caption content to be displayed on a local terminal, that is, inputs all captions to be displayed on three local display terminals; and meanwhile, the user determines attribution information of the entire captions by using the control device. The specific attribute information includes but not limited to:

whether the captions input by a user are local captions or remote captions; this embodiment uses the remote captions as an example for description;

motion attribute information (for example, moving to the left) when the captions input by a user are dynamic captions;

whether the captions input by a user are static captions or dynamic captions;

other display or expression attribute information of the captions input by a user, for example, color, size, and font.

Assume that in this embodiment, the entire caption content input by a user on the control device is: AxxxxxxAxxxxxx-ABxxxxxxBxxxxxxBCxxxxxxCxxxxxxC.

Figure 11:
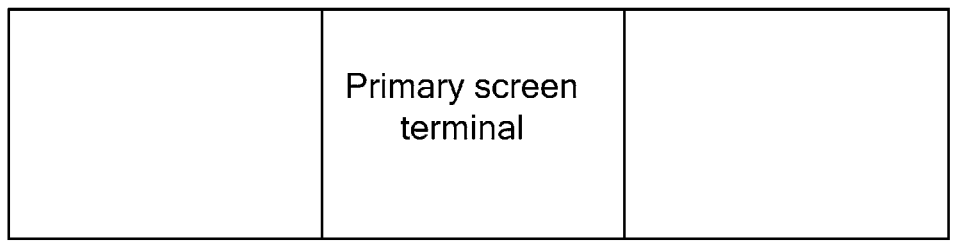
FIG. 11 is a schematic diagram of a home screen terminal according to Embodiment 2 of the present invention.

1002. A remote control device determines one terminal from remote terminals. In this step, the determined terminal may be a primary screen terminal, or a terminal that implements common functions. The primary screen terminal in this embodiment needs to coordinate the control device to implement the control of the caption transmission. During the determination of the primary screen terminal, generally, a primary screen terminal may be set according to a user requirement, or one of the terminals may be fixedly used as a primary screen terminal. As shown in FIG. 11, in this embodiment, remote terminal 2 is used as a primary screen terminal, and therefore local terminal 2 becomes a primary screen terminal accordingly.

1003. The remote control device transmits the received entire caption content and the attribute information corresponding to the caption content to a remote primary screen terminal.

1004. The remote primary screen terminal transmits the entire caption content and the attribute information corresponding to the caption content to a local primary screen terminal.

1005. The local primary screen terminal transmits the entire caption content and the attribute information corresponding to the caption content to a local control device.

In steps 1002 to 1005, the local primary screen terminal and the remote primary screen terminal are used to transmit the entire caption content and the attribute information corresponding to the caption content. However, in actual applications, other terminals instead of the primary screen terminals may also be used to transmit the entire caption content and the attribute information corresponding to the caption content, which is not detailed here again.

1006. The local control device processes the captions according to the entire caption content and the attribute information corresponding to the caption content input by the user, and determines caption content to be displayed on each display terminal and a display timing. The caption content and the display timing determined in the case of different attribute information may be different. For example:

If it is determined that the attribute information is static captions, the control device needs to determine, according to the entire caption content, specific captions to be displayed on each display terminal. For example, when the user inputs the entire caption content "AxxxxxxAxxxxxxABxxxxxx-BxxxxxxBCxxxxxxCxxxxxxC", assume that there are three local display terminals, as shown in FIG. 8, it may be set that display terminal 1 displays "AxxxxxxAxxxxxxA", display terminal 2 displays "BxxxxxxBxxxxxxB", and display terminal 3 displays "CxxxxxxCxxxxxxC". The above example describes a display mode in which the captions are evenly segmented and displayed. During specific implementation, the control device may also use the mode for unevenly segmenting the captions and determines the static caption content to be displayed on each display terminal.

If the attribute information is dynamic captions and the dynamic captions have a motion requirement indicative of rolling to the left, the control device, in addition to segmenting the caption information, needs to implement real-time update according to a dynamic mode set by the user, and transmit the updated information to each display terminal for processing. That is, for the dynamic caption displaying timing, the caption content corresponding to each display terminal needs to be determined. For the entire caption content, if the user requires the rolling to the left, when the caption information to be displayed is input, the caption content to be displayed on the three display terminals at each display timing is shown in FIG. 9, and the control device needs to determine the display timing and caption content at the corresponding display timing according to FIG. 9. The details can be referred to as the description in the embodiment illustrated in FIG. 7, which are not detailed here again.

1007. The control device transmits the determined caption content to each corresponding display terminal according to the display timing. Data volumes to be transmitted in the case of the captions having different attribute information are different, which is described specifically as follows:

If the caption attribution information is set to the static captions, the captions are segmented according to 1006. The control device transmits AxxxxxxAxxxxxxA to display terminal 1, and transmits BxxxxxxBxxxxxxB to display terminal 2, and transmits CxxxxxxCxxxxxxC to display terminal 3, and for the entire caption content that is input once, the control device only needs to transmit the data once.

If the caption attribute information is set to dynamic captions, the captions are segmented according to 1006. The content transmitted to different display terminals at different timings is different. In the example illustrated in FIG. 9, the specific caption content is shown in FIG. 9. The caption content transmitted to display terminal 1 at display timing 1 is AxxxxxxAxxxxxxA, the caption content is transmitted to display terminal 2 at display timing 2 is xxxxxxAxxxxxxAB, and the caption content transmitted to display terminal 3 at display timing 3 is xxxxxAxxxxxxABx.

The caption content transmitted to the other two display terminals at different display timings may not be completely the same, as shown in FIG. 9.

1008. Each display terminal supposes the received caption content and the images displayed on the display terminal, that is, superposes the caption content on a corresponding image according to the display timing so as to display. In this embodiment, remote captions are used for description. Therefore, superposition only needs to be performed on the remote terminal (that is, the remote display terminal).

During implementation of the embodiments of the present invention, centralized control is performed according to the entire caption content and attribute information to determine the content to be displayed on each terminal or determine the display mode of each display terminal so that each display terminal displays the corresponding caption content. By using such centralized control mode, the caption to be displayed on each display terminal does not need to be separately laid out, which facilitates the layout of the caption. Each display terminal only needs to display the caption according to a centralized configuration of the control device, which simplifies the implementation mode of the caption display. In addition, because of the centralized configuration, the case that different captions are displayed on different display terminals at the same time is prevented, and caption error probability is reduced, and the caption negotiation capability between display terminals are enhanced.

Figure 12:
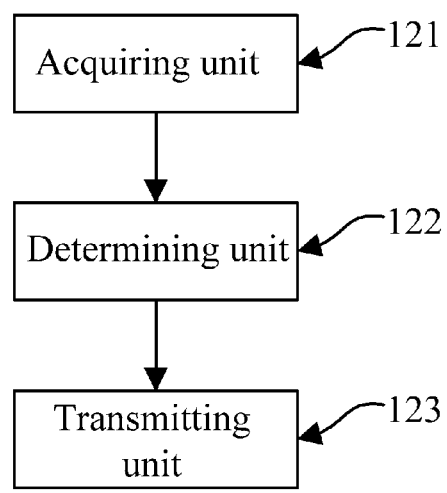
FIG. 12 is a block diagram of a control device according to Embodiment 2 of the present invention.

An embodiment of the present invention also provides a control device which is implemented by an independent control device. The independent control device coordinates display terminals to process captions. The following describes specific implementation of the control device. As shown in FIG. 12, the control device includes: an acquiring unit 121, a determining unit 122, and a transmitting unit 123. The acquiring unit 121, the determining unit 122, and the transmitting unit 123 are similar to those in the implementation solution illustrated in FIG. 5. The difference lies in that: In this embodiment, the entire caption content and the attribute information corresponding to the caption content that are acquired by the acquiring unit 121 may be directly input by a user to the control device, or input by a remote user to a remote control device; then the remote control device transmits the entire caption content and the attribute information to a local terminal by using a remote terminal, and the local terminal transmits the entire caption content and the attribute information to a local control device.

Further, when the final caption content needs to be transmitted to remote terminals for display, the acquiring unit 121 is configured to receive the entire caption content and the attribute information directly input by the user; and the transmitting unit 123 transmits determined caption content to each corresponding remote terminal according to the display timing by using each local terminal. In this manner, the local control device controls the caption display on the remote terminals, implementing remote centralized control of the captions. In addition, a better synchronized display effect may be achieved by using the local control device to process the content to be displayed on the local terminal.

In Embodiments 1 and 2, if the control of the remote captions is involved, corresponding data needs to be transmitted. The protocol for data transmission may use, but not limited to, the following implementation modes:

First, the extended H.323 protocol is used, and the implementation mode of the protocol is as follows:

During receiving and transmitting of the captions, the genericIndication message may be used, which is defined in the following table.

| Message Name | Meaning |
| --- | --- |
| mcuInfoIndication | Indicates the MCU information indication message, which can be applied between an MCU and a terminal or between a terminal and another terminal. |

The genericIndication message may use the structure of GenericMessage. The details are as shown in the following table.

| Structure Name | Structure Description |
| --- | --- |
| Capability identifier type | h221NonStandard |
| Capability identifier value | Refer to the subsequent description |
| subMessageIdentifer | It is fixed at 2, indicating the information message between a terminal and an MCU or between a terminal and another terminal. |
| messageContent | Indicates the specific message content | where:
h221NonStandard   SEQUENCE
{
  t35CountryCode   INTEGER (0..255), --fixed at 0x26
  t35Extension   INTEGER (0..255), --fixed at 0x00
  manufacturerCode   INTEGER (0..65535), --fixed at 0x2011
}

The parameters are defined as follows:

| Parameter Name | Specific Content |
| --- | --- |
| Parameter description | parameterIdentifier uses h221NonStandard (the content can be referred to the above description). parameterValue uses octetString, indicating the specific information. |

-continued

| Parameter Name | Specific Content |
|---|---|
| Parameter identifier value | 1 |
| Parameter status | Mandatory |
| Parameter type | octetString |
| Supersedes | This field shall not be included. |

For the specific information format in octetString, the <TLV> mode may be used.
The specific format is shown in the following table.

| Message Description and Message Type Value | Message Meaning | Field Length | Remarks |
|---|---|---|---|
| Message ID: udwMsgID = 0x0000,0001 | Information message indication | 4 bytes | |
| Total message length: udwMsgDataLen | Length of the message | 4 bytes | Message content ( ) |
| Sub-message list | | | |

The details of the sub-message list in the above table are described in the following table.

| Sub-message Description | Sub-message Type Value | Length of the Sub-message | M/O | Sub-message Data Field Description |
|---|---|---|---|---|
| Caption information | 0x0000,0001 | | M | Refer to the subsequent description |

The sub-message is defined as follows:

| Sub-message ID | Sub-message Description | Sub-message Content | Remarks |
|---|---|---|---|
| 0x0000,0001 | Caption information | Uses the XML format | Refer to the subsequent description |

The protocol includes three parts: information source/destination description+information format+information content. Specifically, the XML format of the sub-message content in the above table is as follows:

```
Basic XML format:
<?xml version="1.0" encoding="UTF-8"?>
<HWVP>
   <Info>
      <Ver>1.0</Ver>
         <Format>T.140<Format>
   </Info>
   <Direction>
        <Source m="M number "t="T number"alias="terminal alias"number="terminal number"/>
             <destination>
                Number of telepresence systems,<MT1>,<MT2>,....
             </destination>
        </Direction>
        <Styles>
          <Style mode="banner" location="TOP" size="24,24" />
          <Motion dir="level" speed="10" />
        </Styles>
        <Content>
          Specific caption information based on T.140
          </Content>
    </HWVP>
```

The items in the above XML format are defined as follows: mode indicates the caption type, including banner (banner), and normal (normal); location indicates the caption display location, including TOP (top), Middle (middle), and Bottom (bottom); size indicates the font size of the displayed caption, with the content being the matrix size, for example, 24×24 matrix; dir indicates the motion direction, including level (level), up (up); and speed indicates the motion speed, for example, 10 pixels per second. During actual applications, the corresponding attribute information may include other information but not limited to those described above. However, the attribute information may still be reduced or supplemented according to actual requirements.

Second, in a caption display system using the SIP protocol, the protocol implementation mode may be: transmitting a session command by using a SIP INFO message or a SIP 200 INFO response. For example, in the info message, the header domain Content-Type is set to application/media_control_hw+xml. The specific message content may also use the XML format.

Third, an independent transmission mode is used. For example, a camera control channel in the existing system is used. In the H.323 and SIP systems, the RTP mode may be used. In RTP, the packetization format uses H.224. The following table describes the Client IDs in the H.224 standard.

| Client Name Standard Client | ID Reference | Recommendation |
|---|---|---|
| CME | 0x00 | H.224 |
| Far End Camera Control | 0x01 | H.281 |
| Text Conversation Protocol | 0x02 | T.140 |
| Reserved | 0x03 through 0x7D | |
| Extended Client ID list | 0x7E | H.224 |
| Non-standard client | 0x7F | H.224 |

The captions are transmitted in T.140 mode. In addition, the caption control format may be used in T.140. Specifically, SOS+"function code"+"parameter character"+ST may be used. The multi-segment definition mode may be used, the format content defined in each segment is smaller than 255 bytes.

SOS+"function code"+"parameter character"+ST is defined in the following table.

| Function | Parameter Character | |
|---|---|---|
| Code | Packet header | Packet content |

The details about SOS/ST can be referred to T.140. The function code uses character "l"=007C. The parameter character includes a packet header and packet content. The format of the packet header is described in the following table.

| Packet Length | Total Number of Packets | Current Packet SN |
|---|---|---|

The Packet Length field occupies four bytes, which are displayed by the ASCII code in digital characters. The Total Number of Packets field occupies two bytes, which are displayed by the ASCII code in digital characters. The Current Packet SN occupies two bytes, which are displayed by the ASCII code in digital characters.

When the packet exceeds 255 characters, it needs to be segmented and the segmentation may be performed based on a common data structure. The details can be referred to the following:

| | | |
|---|---|---|
| +0 | B | Version number (currently be 1) |
| +1 | B | Operation type (0: cancel display; in this case, the caption attribution information does not need to be filled in; 1: display/default) |
| +2 | W | The <M,T> number of a transmit terminal |
| +4 | W | Number of destination terminals (0xFFF0 indicates broadcast) |
| +6 | W * n | <M,T> number of the destination terminal (in the case of broadcast, <M,T> is <0,T>) |
| +6 + 2 * n | B | Caption type (performed by bits. Operations: When "operation type" = "cancel display", multiple caption types may be filled in concurrently. When "operation type" = "display", multiple caption types cannot be filled in concurrently). |

| Bit | Meaning |
|---|---|
| 0000,0001 | Banner |
| 0000,0010 | Prompt message/Default |
| 0000,0100 | Instant message |

| | | |
|---|---|---|
| + ... | B | Caption position (performed by bits. Operations: When "operation type" = "cancel display", multiple caption locations may be filled in concurrently. When "operation type" = "display", multiple caption locations cannot be filled in concurrently). |

| Bit | Meaning |
|---|---|
| 0000,0001 | Top |
| 0000,0010 | Middle |
| 0000,0100 | Bottom/Default |

| | | |
|---|---|---|
| + ... | B | Justification format (performed by bits, the most significant four bits and the least significant bits may be filled in concurrently) |

| Least Significant 4 Bits | Meaning | Most Significant 4 Bits | Meaning |
|---|---|---|---|
| 0000,0001 | Left justify | 0001,0000 | Top justify |
| 0000,0010 | Center justify | 0010,0000 | Center justify |
| 0000,0100 | Right justify | 0100,0000 | Bottom justify |

| | | |
|---|---|---|
| + ... | B | Motion direction (1: rolling upward, 2: rolling to the left) |
| + ... | DW | Background color (the most significant 8 bits indicate transparency, not transparent by default) |
| + ... | DW | Background color (the most significant 8 bits indicate transparency, white by default) |
| + ... | B | Font size (supported font size range: 10 to 27; 24 by default) |
| + ... | B | Validity period (only for prompt captions, ranging from 1 to 5 minutes with an interval of 1 minute, 5 minutes by default) |

In addition, for reliable transmission of the caption information, the RTP implementation mode may also use the following transmission modes: In the H.323 protocol, the caption information may be transmitted over an H.245 channel; in the SIP protocol, the caption content may be encapsulated into an info message for transmission.

Embodiment 3

In a system for caption transmission in telepresence provided in this embodiment, a control device coordinates a display mode of each display terminal, and the display terminal is responsible for determining specific caption content and a display timing according to the display mode, and finally displaying the corresponding caption content according to the determined display timing. In this embodiment, the control device may be an independent device terminal or functions of the control device may be integrated in the display terminal. Further, the control device may be implemented by a multi-point control server connected to a telepresence system through a transport network.

Figure 13:
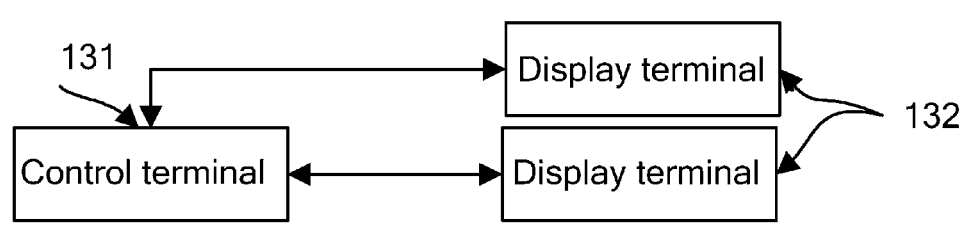
FIG. 13 is a block diagram of a system for caption transmission in telepresence according to Embodiment 3 of the present invention.

As shown in FIG. 13, an embodiment of the present invention provides a system for caption transmission in telepresence, including a control device 131 and at least two display terminals 132.

The control device 131 is configured to determine, according to entire caption content and attribute information corresponding to the caption content, caption content to be displayed on each display terminal and a display timing, and transmit the entire caption content and a display mode to each display terminal. The display mode according to this embodiment includes but not limited to: for example, rolling to the left, rolling to the right, and fading in and fading out. The display terminals 132 are configured to receive entire caption content and a corresponding display mode of a display terminal, determine caption content to be displayed and a display timing according to the display mode and the entire caption content, and superpose the determined caption content to an image according to the display timing.

Figure 14:
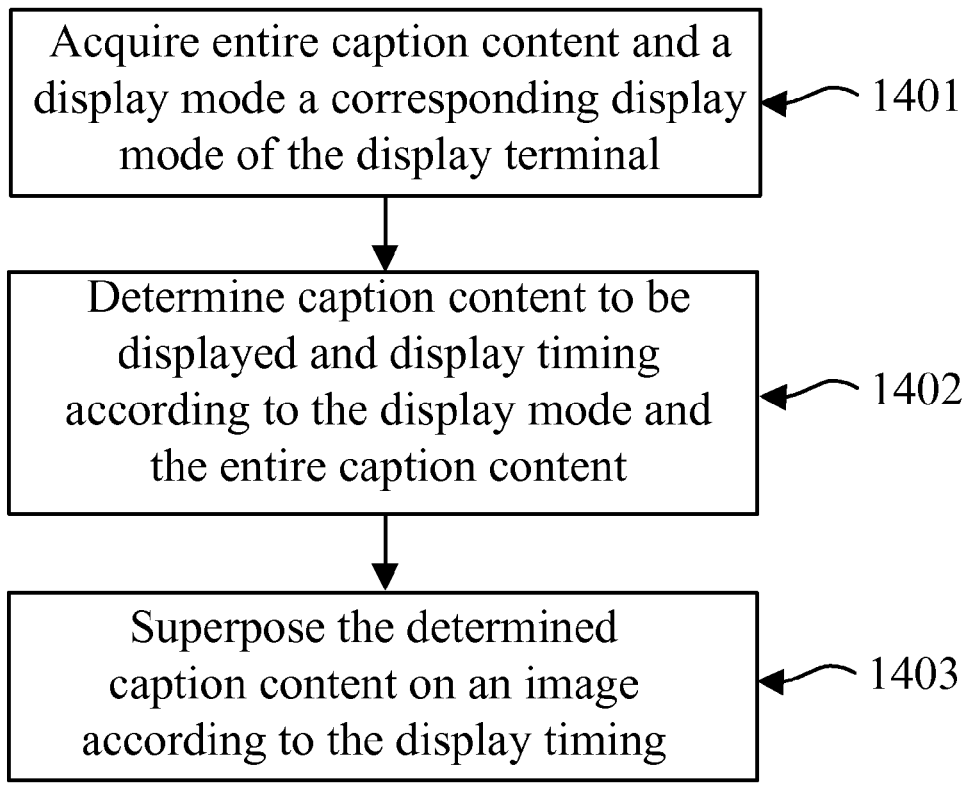
FIG. 14 is a flowchart of a method for caption transmission in telepresence according to Embodiment 3 of the present invention.

An embodiment of the present invention also provides a method for caption transmission in telepresence. As shown in FIG. 14, the method includes:

1401. Receive entire caption content and a display mode corresponding to the display terminal itself. In this embodiment, the display mode is determined according to the entire caption content and the attribution information corresponding to the caption content. The device used for the determination may be an independent device terminal or functions of the control device may be integrated in the display terminal. Further, the device may be implemented by a multi-point control server connected to a telepresence system through a transport network.

1402. Determine caption content to be displayed and a display timing according to the display mode and the entire caption content. That is, in this step, the content to be displayed on the display terminal at each display timing needs to be determined. In the case of a caption with the motion attribution information, the content corresponding to each display timing during the change process is included.

During the determination of the caption content to be displayed on each display terminal and the display timing, other features such as the font, size, and color of the caption content to be displayed on each display terminal may be further determined according to the attribute information so that the display terminal displays richer captions.

1403. Superpose the determined caption content to an image according to the display timing. The specific superposition mode may be directly synthesizing the captions to the corresponding image, and then the display terminal plays the image.

Figure 15:
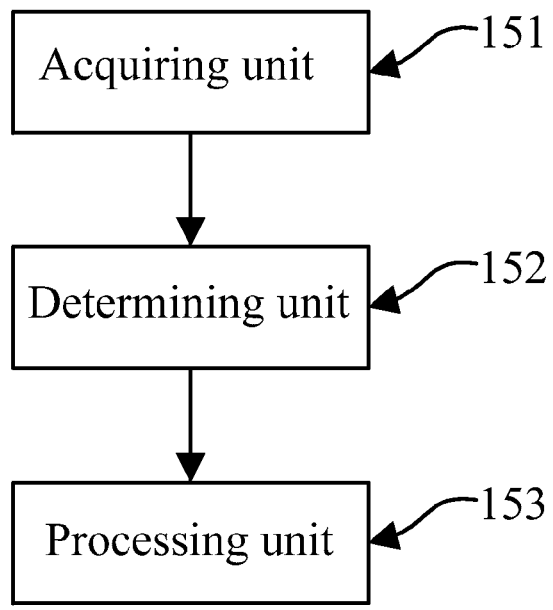
FIG. 15 is a block diagram of a display terminal according to Embodiment 3 of the present invention.

An embodiment of the present invention also provides display terminal. As shown in FIG. 15, the display terminal includes: an acquiring unit 151, a determining unit 152, and a processing unit 153. The acquiring unit 151 is configured to acquire entire caption content and a display mode corresponding to the display terminal itself, where the display mode is determined according to the entire caption content and the attribute information corresponding to the caption content; the determining unit 152 is configured to determine caption content to be displayed and a display timing according to the display mode and the entire caption content; the processing unit 153 is configured to superpose the determined caption content to an image according to the display timing.

The following describes the solution that an independent control device is used as a control device as an example for description. The control device and display terminals compose a system. In this embodiment, a display terminal is another expression for a local terminal. The control device is configured to determine, according to entire caption content and attribute information corresponding to the caption content, caption content to be displayed on each display terminal and a display timing, and transmit the entire caption content and a display mode to each display terminal. The display terminal is configured to receive entire caption content and a corresponding display mode of a display terminal, determine caption content to be displayed and a display timing according to the display mode and the entire caption content, and superpose the determined caption content on an image according to the display timing. To acquire the entire caption content and the attribute information, the control device according to the embodiments of the present invention is further configured to receive the entire caption content and the attribute information corresponding to the caption content directly input by a user. That is, the user may directly input the entire caption content and the attribute information corresponding to the caption content by using a local control device; and determine, according to entire caption content and attribute information corresponding to the caption content, caption content to be displayed on each display terminal and a display timing.

Figure 16:
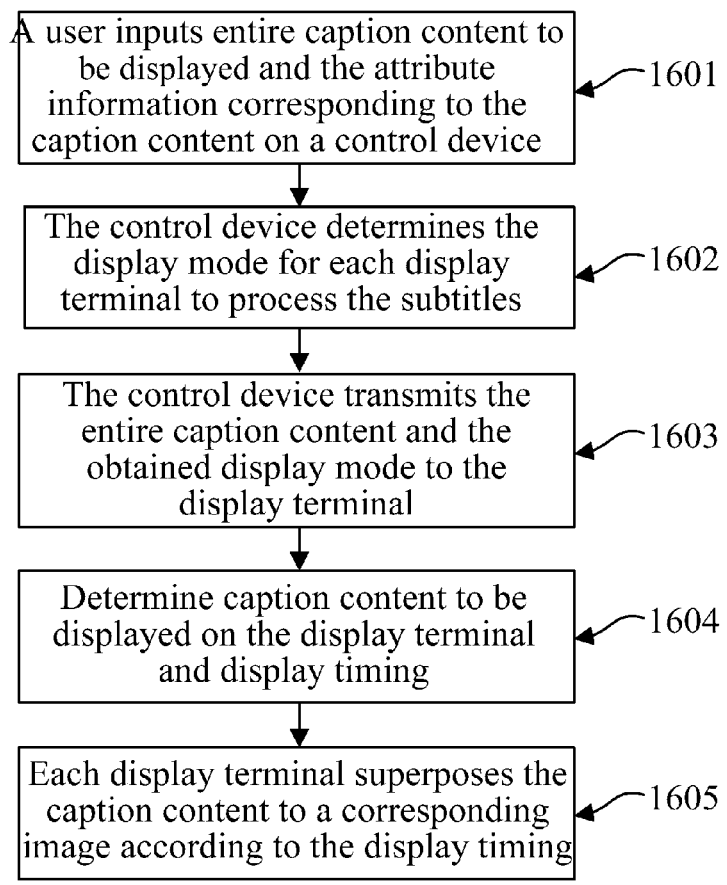
FIG. 16 is a flowchart of another method for caption transmission in telepresence according to Embodiment 3 of the present invention.

An embodiment of the present invention also provides a method for caption transmission in telepresence. As shown in FIG. 16, the method includes:

1601. The user inputs the desired entire caption content on the control device, that is, inputs all captions to be displayed on three display terminals; and meanwhile, the user determines the attribution information of the entire caption by using the control device. The specific attribute information includes but not limited to:

whether the captions input by a user are local captions or remote captions; this embodiment uses the local captions as an example for description;

whether the captions input by a user are static captions or dynamic captions;

motion attribute information (for example, moving to the left) when the captions input by a user are dynamic captions;

other displayed or expressed attribute information of the captions input by a user, for example, color, size, and font.

Assume that in this embodiment, the entire caption content input by a user in the control device is: AxxxxxxAxxxxxxABxxxxxxBxxxxxxBCxxxxxxCxxxxxxC.

1602. The control device processes the captions according to the entire caption content and the attribute information corresponding to the caption content input by the user, and determines the caption content to be displayed on each display terminal and the display timing. Regardless of whether local captions or remote captions, the specific processing mode may include:

If the user inputs static captions, the control device processes the caption information and determines the caption display mode of each terminal. Generally, an even segmentation mode is used to process the entire caption content. In this case, the control device determines the following display schemes for each display terminal:

Display terminal 1: displays the "AxxxxxxAxxxxxxA" part in the character string;

Display terminal 2: displays the "BxxxxxxBxxxxxxB" part in the character string;

Display terminal 3: displays the "CxxxxxxCxxxxxxC" part in the character string.

If the user inputs dynamic captions, after processing the caption information, the control device also needs to determine the caption display mode of each terminal. Assume that the motion requirement of the dynamic caption is rolling to the left by one character per second, the control device determines the following display schemes for each display terminal:

Display terminal 1: uses the first character as the start position, rolls to the right by one character every second from the start position, displays 15 characters from the start position, and displays all characters in the case of fewer than 15 characters. In this embodiment, the caption content information initially displayed by display terminal 1 caption is "AxxxxxxAxxxxxxA", and rolls to the left by one character per second. Therefore, one second later, the displayed caption content is "xxxxxxAxxxxxxAB".

Display terminal 2: uses the sixteenth character as the start position, rolls to the right by one character every second from the start position, displays 15 characters from the start position, and displays all characters in the case of fewer than 15 characters. In this embodiment, the caption content information initially displayed by display terminal 2 caption is "BxxxxxxBxxxxxxB", and rolls to the left by one character per second. Therefore, one second later, the displayed caption content is "xxxxxxBxxxxxxBC".

Display terminal 3: uses the thirty-first character as the start position, rolls to the right by one character every second from the start position, displays 15 characters from the start position, and displays all characters in the case of fewer than 15 characters. In this embodiment, the caption content information initially displayed by display terminal 3 caption is "CxxxxxxCxxxxxxC", and rolls to the left by one character per second. Therefore, one second later, the displayed caption content is "xxxxxxCxxxxxxCA".

During the specific implementation, the display modes generated by the control device may also include the specific display location information, character information, or font color.

1603. The control device transmits the entire caption content and the display mode determined in 1602 to each display terminal. The specific method for transmitting the display mode can be referred to the description for each display mode in 1602, which is not detailed here again.

1604. After receiving the entire caption content and the corresponding display mode of the display terminal, each display terminal processes the captions to obtain its own display caption content and a display timing.

1605. Each display terminal superposes the caption content to a corresponding image according to the display timing so as to display. In this embodiment, local captions are used for description. Therefore, superposition only needs to be performed on the local terminal (that is, the local display terminal).

The embodiments of the present invention are capable of processing both local captions and remote captions. In this case, the local terminal needs to transmit the entire caption content and the display mode to a remote display terminal. For example, each local terminal transmits the caption content to a corresponding remote terminal according to the display timing or one local terminal or one control device transmits the caption content to the remote terminal according to the display timing; and then the remote display terminal resolves the display mode and superposes the caption content. That is, the remote display terminal uses the resolved captions as image content, superposes the caption content and the decoded video code streams on an image, and then displays the image after superposition.

During implementation of the method, terminal and system for caption transmission in telepresence according to the embodiments of the present invention, centralized control is performed according to the entire caption content and attribute information to determine the content to be displayed on each terminal or determine the display mode of each display terminal so that each display terminal displays the corresponding caption content. By using such centralized control mode, the caption to be displayed on each display terminal does not need to be separately laid out, which facilitates the layout of the caption. Each display terminal only needs to display the caption according to a centralized configuration of the control device, which simplifies the implementation mode of the caption display. In addition, because of the centralized configuration, the case that different captions are displayed on different display terminals at the same time is prevented, and caption error probability is reduced, and the caption negotiation capability between display terminals are enhanced.

For the solution that the display mode is resolved by using the display terminal according to Embodiment 3, the entire caption content and the attribute information acquired by the local control device may be directly input by using the local control device or input by using the following solution: The user directly inputs the entire caption content and the attribute information to the remote control device, and transmit the entire caption content and the attribute information to a remote primary screen terminal by using the solution similar to Embodiment 2; the remote primary screen terminal transmits the entire caption content and the attribute information to a local primary screen terminal; and finally the local primary screen terminal forwards the entire caption content and the attribute information to the local control device.

Figure 17:
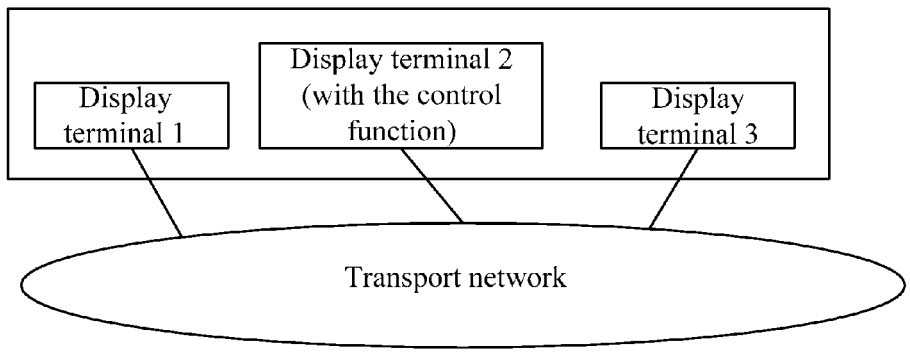
FIG. 17 is a block diagram of another system for caption transmission in telepresence according to Embodiment 3 of the present invention.

In the implementation solutions described in Embodiments 1, 2, and 3, the control device is an independent device. During specific applications, some telepresence system may not have the control device. In this case, a terminal having the control function may be used as the control device, as shown in FIG. 17. Display terminal 2 has the control function of a control device, and therefore is used to coordinate three terminals to implement centralized processing of captions.

Figure 18:
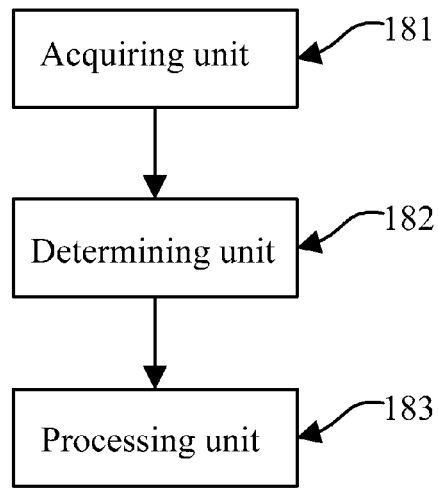
FIG. 18 is a block diagram of another display terminal according to Embodiment 3 of the present invention.

An embodiment of the present invention also provides display terminal. As shown in FIG. 18, the display terminal includes: an acquiring unit 181, a determining unit 182, and a processing unit 183.

The acquiring unit 181, the determining unit 182, and the transmitting unit 183 are similar to those in the implementation solution illustrated in FIG. 15. The difference lies in that the following cases are included according to the determination of the display mode:

First, if the display mode is determined by a local control device according to the entire caption content and the attribute information corresponding to the caption content, the entire caption content and the attribute information corresponding to the caption content may be the entire caption content and the attribute information input by a user to the local control device; or may be the entire caption content and the attribute information corresponding to the caption content that are transmitted by a remote control device by using a remote terminal and a local terminal by turn; or may be the entire caption content and the attribute information corresponding to the caption content directly input by a remote control device to a local control device. In this case, the acquiring unit 181 is configured to acquire the entire caption content and the corresponding display mode of the display terminal that are transmitted by the local control device.

Second, if the display mode is determined in a centralized manner by a remote control device according to the entire caption content and the attribute information corresponding to the caption content, the acquiring unit 181 is configured to acquire the entire caption content and a display mode corresponding to the display terminal itself that are transmitted by the remote control device.

In this embodiment, the control device may be an independent device terminal or the function of the control device may be integrated in the display terminal, as shown in FIG. 17.

During implementation of the method, terminal and system for caption transmission in telepresence according to the embodiments of the present invention, centralized control is performed according to the entire caption content and attribute information, the control device determines the content to be displayed on each terminal or the display mode of each display terminal, and transmits the determined caption content and display mode to each display terminal so that each display terminal displays the corresponding caption content according to the determined display mode. By using such centralized control mode, the caption to be displayed on each display terminal does not need to be separately laid out, which facilitates the layout of the caption. Each display terminal only needs to display the caption according to a centralized configuration of the control device, which simplifies the implementation mode of the caption display. In addition, because of the centralized configuration, the case that different captions are displayed on different display terminals at the same time is prevented, and caption error probability is reduced, and the caption negotiation capability between display terminals are enhanced.

Embodiment 4

Figure 19:
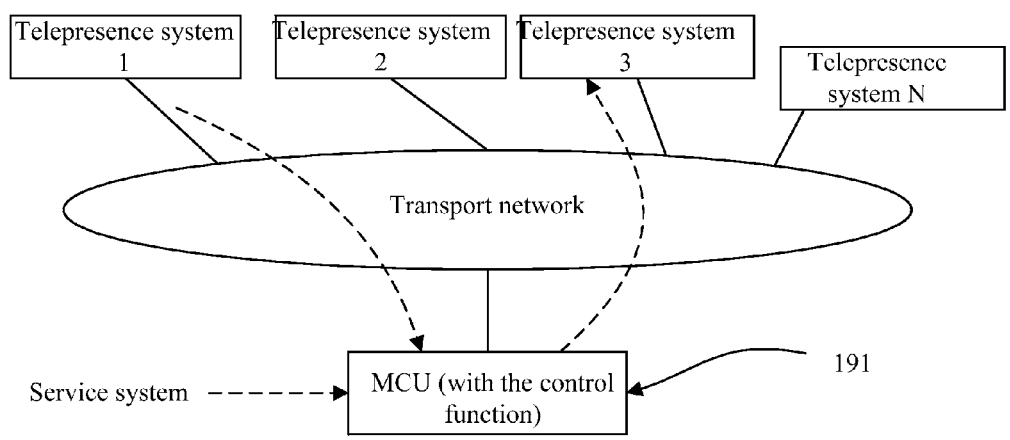
FIG. 19 is a block diagram of a system for caption transmission in telepresence according to Embodiment 4 of the present invention.

The following describes the solution that a multi-point control server (for example, an MCU) is used as a control device as an example for description. The multi-point control server is connected to a telepresence system through a transport network, as shown in FIG. 19.

A multi-point control server 191 and multiple telepresence systems compose a communication system. Each telepresence system has multiple display terminals (not shown in FIG. 19)

The multi-point control server 191 is configured to receive entire caption content and attribute information to the entire caption content, determine, according to the entire caption content and the attribute information corresponding to the caption content, caption content to be displayed on each display terminal and a corresponding display mode of each display terminal, and transmit the entire caption content and the display mode to each display terminal. The display terminal is configured to receive the entire caption content and a display mode corresponding to the display terminal, determine caption content to be displayed and a display timing according to the display mode and the entire caption content, and superpose the determined caption content on an image according to the display timing.

Specifically, a user may input the entire caption content and the attribute information to the multipoint control server 191 by using a service system (also referred to as MCU management software, which manages telepresence, implementing functions of scheduling and managing telepresence resources and controlling and managing telepresence resources during telepresence); or a certain user in telepresence transmits the entire caption content and the attribute information corresponding to the caption content to the multipoint control server by using a local terminal, and, after processing the entire caption content and the attribute information, the multipoint control server 191 transmits the entire caption content and the attribute information to a display terminal in another telepresence system to resolve and superposecaption; or a remote terminal transmits the entire caption content and the attribute information corresponding to the caption content to the multipoint control server 191, and, after processing the entire caption content and the attribute information, the multipoint control server 191 transmits the entire caption content and the attribute information to a local display terminal to resolve and superposecaption.

In actual operations, for convenience of centralized control, the multipoint control server in the embodiments of the present invention is further configured to, before receiving the entire caption content and the attribute information transmitted by the user by using the local terminal or the remote terminal, receive a caption control request transmitted by the local terminal or the remote terminalcaption, and transmit a response allowing caption control to the local terminal or the remote terminal for establishing a connection.

Figure 20:
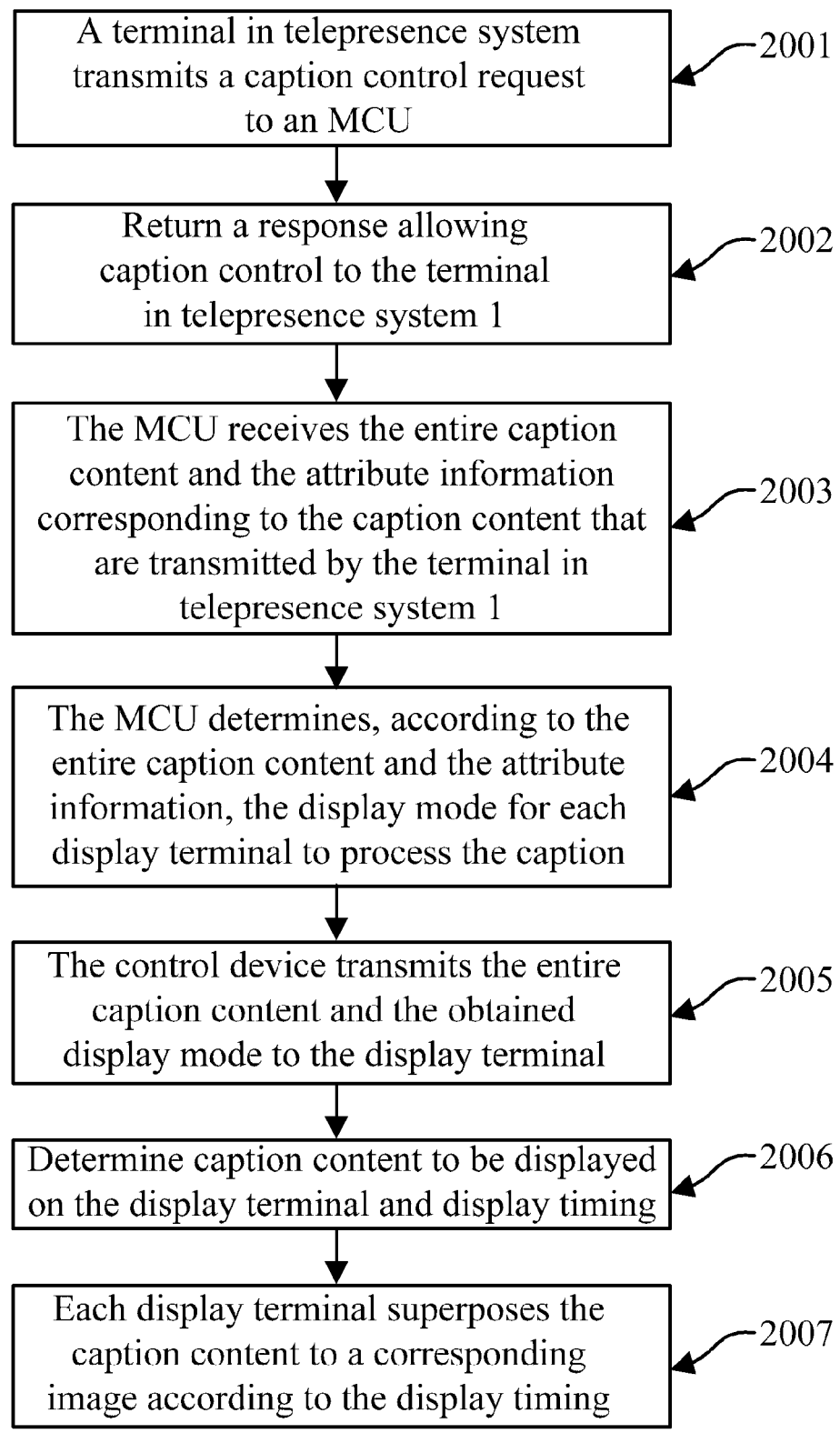
FIG. 20 is a flowchart of a method for caption transmission in telepresence according to Embodiment 4 of the present invention.

An embodiment of the present invention also provides a method for caption transmission in telepresence. During actual operations for multipoint telepresence captions, especially for transmission of remote captions, a multipoint conference system may set a caption control right for a terminal. That is, according to this method, in the initial state, it may be set that the terminals cannot transmit the remote caption information. As shown in FIG. 20, the method includes:

2001. Telepresence system 1 in FIG. 19 needs to transmit remote captions to telepresence system 3. First, a terminal in telepresence system 1 transmits a caption control request to an MCU.

2002. After receiving the caption control request message, if allowing the control of the captions, the MCU returns a response allowing caption control to a terminal in telepresence system 1, and meanwhile the MCU enters caption receiving and processing status.

2003. After receiving the response, the terminal in telepresence system 1 may transmit the remote caption information; and the MCU receives entire caption content and attribute information transmitted by the terminal in telepresence system 1.

The specific attribute information includes but not limited to the following:

whether the captions input by a user are local captions or remote captions; this embodiment uses the remote captions as an example for description;

whether the captions input by a user are static captions or dynamic captions;

motion attribute information (for example, moving to the left) when the captions input by a user are dynamic captions;

other displayed or expressed attribute information of the captions input by a user, for example, color, size, and font.

Assume that in this embodiment, the entire caption content input by a user in the control device is: AxxxxxxAxxxxxx-ABxxxxxxBxxxxxxBCxxxxxxCxxxxxxC.

The user may also directly input the entire caption content and the attribute information to the MCU by using a service system (or MCU management software). In this manner, the above 2001 and 2003 may be omitted.

2004. The MCU processes the captions according to the entire caption content and the attribute information corresponding to the caption content input by the user, and determines caption content to be displayed on each display terminal and a display timing. The specific processing mode may includes:

If the user inputs static captions, the control device processes the caption information and determines a caption display mode of each terminal. Generally, an even segmentation mode is used to process the entire caption content. In this case, the control device determines the following display schemes for each display terminal:

Display terminal 1: displays the "AxxxxxxAxxxxxxA" part in the character string;

Display terminal 2: displays the "BxxxxxxBxxxxxxB" part in the character string;

Display terminal 3: displays the "CxxxxxxCxxxxxxC" part in the character string.

If the user inputs dynamic captions, after the MCU processes the caption information, the MCU also needs to determine a caption display mode of each terminal. Assume that the motion requirement of the dynamic caption is rolling to the left by one character per second, the control device determines the following display schemes for each display terminal:

Display terminal 1: uses the first character as the start position, rolls to the right by one character every second from the start position, displaying 15 characters from the start position, and displays all characters in the case of fewer than 15 characters. In this embodiment, the caption content information initially displayed by display terminal 1 caption is "AxxxxxxAxxxxxxA", and rolls to the left by one character per second. Therefore, one second later, the displayed caption content is "xxxxxxAxxxxxxAB".

Display terminal 2: uses the sixteenth character as the start position, rolls to the right by one character every second from the start position, displays 15 characters from the start position, and displays all characters in the case of fewer than 15 characters. In this embodiment, the caption content information initially displayed by display terminal 2 caption is "BxxxxxxBxxxxxxB", and rolls to the left by one character per second. Therefore, one second later, the displayed caption content is "xxxxxxBxxxxxxBC".

Display terminal 3: uses the thirty-first character as the start position, rolls to the right by one character every second from the start position, displays 15 characters from the start position, and displays all characters in the case of fewer than 15 characters. In this embodiment, the caption content information initially displayed by display terminal 3 caption is "CxxxxxxCxxxxxxC", and rolls to the left by one character per second. Therefore, one second later, the displayed caption content is "xxxxxxCxxxxxxCA".

During the specific implementation, the display modes generated by the control device may also include the specific display location information, character information, or font color.

2005. The MCU transmits the entire caption content and the obtained display mode to each display terminal.

2006. After receiving the entire caption content and the corresponding display mode of the display terminal, each display terminal processes the captions in a centralized manner to obtain its own display caption content and display timing.

2007. Each display terminal superposes the caption content to a corresponding image according to the display timing so as to display.

During the specific implementation, the MCU may also be implemented in the modes described in Embodiments 1 and 2, and determine caption content and a display timing of each display terminal, and transmit the caption content to each display terminal according to the display timing. The display terminal superposes the caption content to an image by using the mode described in Embodiment 1 or 2.

Figure 21:
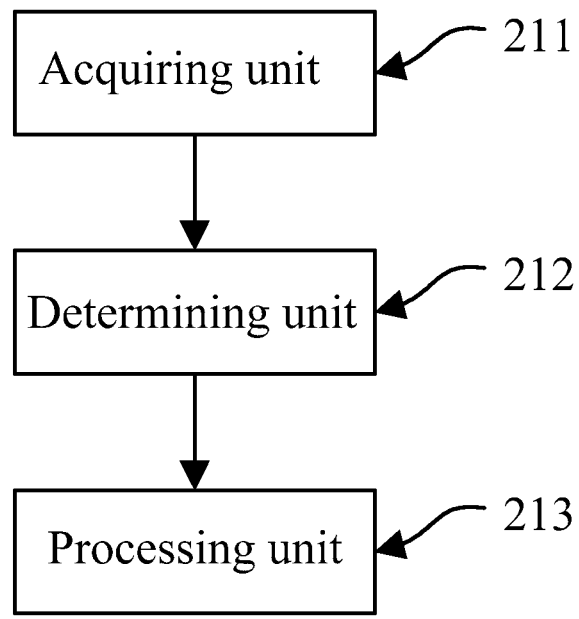
FIG. 21 is a block diagram of a display terminal according to Embodiment 4 of the present invention.

An embodiment of the present invention also provides display terminal. As shown in FIG. 21, the display terminal includes: an acquiring unit 211, a determining unit 212, and a processing unit 213. The determining unit 212 and the processing unit 213 are similar to those in the implementation solution illustrated in FIG. 15. This embodiment differs from the embodiment illustrated in FIG. 15 in that: In this embodiment, a multipoint control server connected to a telepresence system through a transport network transmits determines the display mode in a centralized manner according to the entire caption content and the attribute information; and the acquiring unit 211 is configured to acquire the entire caption content and the corresponding display mode of the display terminal transmitted by the multi-point control server. Generally, the entire caption content and the attribute information are the entire caption content and the attribute information corresponding to the caption content input by a user by using a service system, or transmitted by a user by using a local terminal or a remote terminal.

To ensure that the local terminal or the remote terminal is capable of acquiring the caption control right, the multipoint control server according to the embodiments of the present invention is further configured to, before the user transmits the entire caption content and the attribute information by using the local terminal or the remote terminal, receives a caption control request transmitted by the local terminal or the remote terminal, and transmits a response allowing caption control to the local terminal or the remote terminal.

Figure 22:
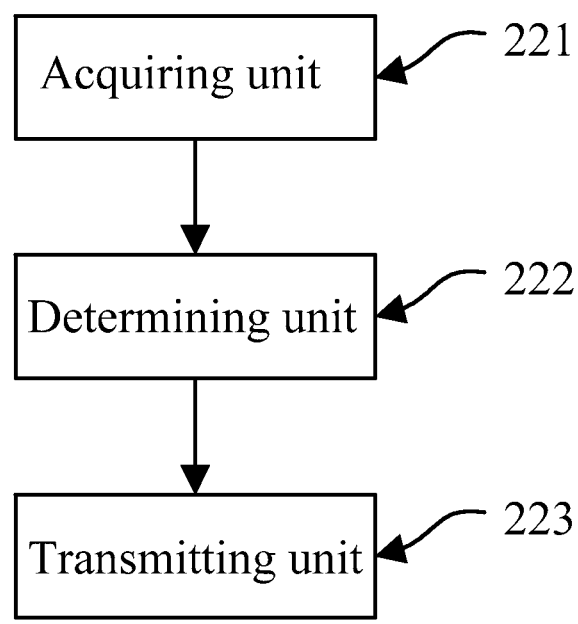
FIG. 22 is a block diagram of a control device according to Embodiment 4 of the present invention.

An embodiment of the present invention also provides a control device, which is implemented by a multipoint control server connected to a telepresence system through a transport network. As shown in FIG. 22, the multipoint control server includes: an acquiring unit 221, a determining unit 222, and a transmitting unit 223. The determining unit 222 and the transmitting unit 223 are similar to those in the implementation solution illustrated in FIG. 5. This embodiment differs from the embodiment illustrated in FIG. 5 in that: In this embodiment, captions need to be displayed on a remote terminal, that is, using the remote terminal as a display terminal; the acquiring unit 221 is configured to acquire entire caption content and attribute information input by a user using a service system; or the acquiring unit 221 is configured to receive the entire caption content and the attribute information transmitted by a user by using a local terminal/a remote terminal.

To ensure that the local terminal or the remote terminal is capable of acquiring the caption control right, the acquiring unit 221 according to the embodiment of the present invention is further configured to, before the user transmits the entire caption content and the attribute information by using the local terminal/the remote terminal, receives a caption control request transmitted by the local terminal or the remote terminal; and the transmitting unit 223 is further configured to transmit a response allowing caption control to the local terminal/the remote terminal.

The process that the terminal requests to acquire the caption control right involves communication between devices, and in the process, the applicable protocol includes but not limited to the following implementation modes:

First, in an H.323 system, the protocol implementation mode is that the H.245 message extension may be used for the control operation for the captions. In the actual application scenarios, the request may be transmitted by using the genericRequest message, and the content of the message is as follows:

| Message Name | Meaning |
|---|---|
| mcuInfoRequest | Indicates the MCU information request message | genericRequest uses the structure of GenericMessage. The details can be referred to the following table.

| Structure Name | Structure Description |
|---|---|
| Capability identifier type | h221NonStandard |
| Capability identifier value | Refer to the subsequent description |
| subMessageIdentifer | It is fixed at 2, indicating the information message between a terminal and an MCU. |
| messageContent | Indicates the specific message content | where:
h221NonStandard  SEQUENCE
{
  t35CountryCode  INTEGER (0..255), --fixed at 0x26
  t35Extension  INTEGER (0..255), --fixed at 0x00
  manufacturerCode  INTEGER (0..65535), --fixed at 0x2011
}

The parameters are defined in the following table.

| Parameter Name | Specific Content |
|---|---|
| Parameter description | parameterIdentifier uses h221NonStandard (the content can be referred to the above description). parameterValue uses octetString, indicating the specific information. |
| Parameter identifier value | 1 |
| Parameter status | Mandatory |
| Parameter type | octetString |
| Supersedes | This field shall not be included. |

For the specific information format in octetString, the <TLV> mode may be used. The specific format is shown in the following:

| Message Description and Message Type Value | Message Meaning | Field Length | Remarks |
|---|---|---|---|
| Message ID: udwMsgID = 0x0000,0002 | Information message request | 4 bytes | |
| Total message length: udwMsgDataLen Sub-message list | Length of the message | 4 bytes | Message content ( ) |

The sub-message list in the above table is defined as follows:

| Sub-message Description | Sub-message Type Value | Length of the Sub-message | M/O | Sub-message Data Field Description |
|---|---|---|---|---|
| Requesting terminal caption capability | 0x0000,0002 | | O | Refer to the subsequent description |
| Requesting caption control | 0x0000,0004 | | O | Refer to the subsequent description |

Similarly, the response message may be sent by using a genericResponse message. The specific definition is as follows:

| Message Name | Meaning |
|---|---|
| mcuInfoResponse | Indicates the MCU information response message | genericResponse uses the structure of GenericMessage. The details can be referred to the following table.

| Structure Name | Structure Description |
|---|---|
| Capability identifier type | h221NonStandard |
| Capability identifier value | Refer to the subsequent description |
| subMessageIdentifer | It is fixed at 2, indicating the information message between a terminal and an MCU. |
| messageContent | Indicates the specific message content | where:
h221NonStandard   SEQUENCE
{
   t35CountryCode   INTEGER (0..255), --fixed at 0x26
   t35Extension   INTEGER (0..255), --fixed at 0x00
   manufacturerCode   INTEGER (0..65535), --fixed at 0x2011
}

The parameters are defined in the following table.

| Parameter name | Specific Content |
|---|---|
| Parameter description | parameterIdentifier uses h221NonStandard (the content can be referred to the above description). parameterValue uses octetString, indicating the specific information. |

| Parameter name | Specific Content |
|---|---|
| Parameter identifier value | 1 |
| Parameter status | Mandatory |
| Parameter type | octetString |
| Supersedes | This field shall not be included. |

For the specific information format in octetString, the <TLV> mode may be used. The specific format is as follows:

| Message Description and Message Type Value | Message Meaning | Field Length | Remarks |
|---|---|---|---|
| Message ID: udwMsgID = 0x0000,0003 | Information message response | 4 bytes | |
| Total message length: udwMsgDataLen | Length of the message | 4 bytes | Message content ( ) |
| Sub-message list | | | |

The sub-message list in the above table is defined in the following table (request response message).

| Sub-message Description | Sub-message Type Value | Length of the Sub-message | M/O | Sub-message Data Field Description |
|---|---|---|---|---|
| Terminal caption capability description | 0x0000,0003 | | O | Refer to the subsequent description |
| Caption control response | 0x0000,0005 | | O | Refer to the subsequent description |

| Sub-message ID | Sub-message Description | Sub-message Content | Remarks |
|---|---|---|---|
| 0x0000,0002 | Requesting terminal caption capability | | |
| 0x0000,0003 | Terminal caption capability description | +0 W Number of telepresence systems<br>+2 B M number of telepresence system 1<br>+3 B T number of telepresence system 1<br>+4 B Whether the captions are supported (0: supported, 1: not supported)<br>+8 ~ . . .<br>+~ B M number of telepresence system n<br>+~ B T number of telepresence system n<br>+~ B Whether the captions are supported (0: supported, 1: not supported) | |
| 0x0000,0004 | Requesting caption control | +0 B Request type (0: cancel, 2: request) [request]:<br>+1 B Control right<br>1: Only the chairman can transmit the request<br>Others: reserved | Used only by the chairman |
| 0x0000,0005 | Caption control response | +0 B Result (0: successful, 1: failed) [failed]:<br>+1 B control right description<br>0: free transmission<br>1: Only the chairman can transmit the response<br>Others: reserved | |

Second, in a SIP system, the protocol implementation mode may be transmitting a session command by using a SIP INFO message or a SIP 200 INFO response.

All embodiments of the present invention are used for caption transmission in telepresence. During specific implementation, in the telepresence communication, the caption capabilities may also be negotiated. Similarly, the protocol extension for capability negotiation may use the following modes: First, in the H.323 protocol, the H.245 capability message can be used; second, in the SIP protocol, the info message may be extended.

According to the above description of the embodiments, a person skilled in the art can easily understsands that the embodiments of the present invention can be implemented by using software in combination with necessary hardware. It should be noted that the present invention may also be implemented by using the hardware. However, in most cases, implementation using software in combination with necessary hardware is preferred. Based on such understandings, the technical solutions or part of the technical solutions disclosed in the present invention that makes contributions to the prior art may be essentially embodied in the form of a software product. The software product may be stored in a storage medium such as read only memory, random access memory, magnetic disk, or compact disc-read only memory. The software product includes a number of instructions that enable a computer (personal computer, server, or network device) device to execute the methods provided in the embodiments of the present invention.

In conclusion, the above are merely exemplary embodiments of the present invention. The scope of the present invention is not limited thereto. Variations or replacements readily apparent to persons skilled in the prior art within the technical scope of the present invention should fall within the protection scope of the present invention. Therefore, the protection scope of the present invention is subjected to the appended claims.

What is claimed is:

1. A method for caption transmission for telepresence, comprising:
   acquiring, by a multi-point control server connected to a telepresence system through a transport network, entire caption content and attribute information corresponding to the caption content, wherein the acquiring comprises:
      receiving the entire caption content and the attribute information corresponding to the caption content input by a user through a service system, or
      receiving the entire caption content and the attribute information corresponding to the caption content that are transmitted by a local terminal or a remote terminal;
   determining, by the multi-point control server, according to the entire caption content and the attribute information corresponding to the caption content, caption content to be displayed on each display terminal in a conference and a display timing; and
   transmitting, by the multi-point control server, the determined caption content to each corresponding display terminal according to the display timing so that each display terminal superposes the determined caption content to an image, wherein each display terminal is a remote terminal.

2. The method according to claim 1,
   wherein the acquiring the entire caption content and the attribute information comprises receiving the entire caption content and the attribute information corresponding to the caption content input by the user; and
   wherein the transmitting the determined caption content to each corresponding display terminal according to the display timing comprises: transmitting the determined caption content to each remote terminal according to the display timing by using a local terminal.

3. The method according to claim 1, wherein the acquiring the entire caption content and the attribute information comprises receiving the entire caption content that are transmitted by the local terminal or a remote terminal, and the method further comprises:
   before receiving the entire caption content and the attribute information corresponding to the caption content that are transmitted by the local terminal or the remote terminal, receiving a caption control request transmitted by the local terminal or the remote terminal; and
   transmitting a response allowing caption control to the local terminal or the remote terminal.

4. A method for caption transmission for telepresence comprising:
   acquiring entire caption content and a corresponding display mode of a display terminal, wherein the display mode is determined according to the entire caption content and attribute information corresponding to the caption content;
   determining caption content to be displayed according to the display mode and the entire caption content;
   determining a display timing according to the display mode and the entire caption content; and
   superposing the determined caption content to an image according to the display timing;
   if the display mode is determined by a local control device according to the entire caption content and the attribute information corresponding to the caption content, the acquiring the entire caption content and the corresponding display mode of the display terminal comprises: acquiring the entire caption content and the corresponding display mode of the display terminal that are transmitted by the local control device; wherein the entire caption content and the attribute information corresponding to the caption content are (i) directly input by a user to the local control device, or (ii) transmitted by a remote control device to the local control device;
   if the display mode is determined by the remote control device according to the entire caption content and the attribute information corresponding to the caption content, the acquiring the entire caption content and the corresponding display mode of the display terminal comprises: acquiring the entire caption content and the corresponding display mode of the display terminal that are transmitted by the remote control device;
   if the display mode is determined by a multi-point control server connected to a telepresence system through a transport network according to the entire caption content and the attribute information corresponding to the caption content, the acquiring the entire caption content and the corresponding display mode of the display terminal comprises: acquiring the entire caption content and the corresponding display mode of the display terminal transmitted by the multi-point control server; wherein the entire caption content and the attribute information corresponding to the caption content are (i) input by a user by using a service system, or (ii) transmitted by the user by using a local terminal or a remote terminal.

5. The method according to claim 4, wherein if the display mode is determined by the multi-point control server connected to the telepresence system through the transport network according to the entire caption content and the attribute information corresponding to the caption content, the method further comprises:

before receiving the entire caption content transmitted by the local terminal or the remote terminal and the attribute information corresponding to the caption content, transmitting a caption control request to the multi-point control server by using the local terminal or the remote terminal; and receiving, by the local terminal or the remote terminal, a response allowing caption control transmitted by the multi-point control server.

6. A control device, which comprises a multi-point control server connected to a telepresence system through a transport network, the control device comprising:

a memory storing instructions thereon; and a processor coupled to the memory and implements the instructions to:

acquire entire caption content and attribute information corresponding to the caption content input by a user by using a service system, or receive the entire caption content and the attribute information corresponding to the caption content that are transmitted by a local terminal or a remote terminal;

determine according to the entire caption content and the attribute information corresponding to the caption content, caption content to be displayed on each display terminal in a conference;

determine according to the entire caption content and the attribute information corresponding to the caption content, a display timing; and transmit the determined caption content to each corresponding display terminal according to the display timing so that each display terminal superposes the determined caption content to an image, wherein each display terminal is a remote terminal.

7. The control device according to claim 6, wherein the entire caption content and the attribute information corresponding to the caption content are input by the user; and wherein transmitting the determined caption content to each remote terminal comprises transmitting the determined caption content using a local terminal.

8. A display terminal, comprising:

a memory storing instructions thereon; and a processor coupled to the memory and implements the instructions to:

acquire entire caption content and a corresponding display mode of a display terminal, wherein the display mode is determined according to the entire caption content and the attribute information corresponding to the caption content;

determine caption content to be displayed and a display timing according to the display mode and the entire caption content; and superpose the determined caption content to an image according to the display timing, wherein if the display mode is determined by a local control device according to the entire caption content and the attribute information corresponding to the caption content, the display terminal is configured to: acquire the entire caption content and the corresponding display mode of the display terminal that are transmitted by the local control device;

wherein if the display mode is determined by a remote control device according to the entire caption content and the attribute information corresponding to the caption content, the display terminal is configured to: acquire the entire caption content and the corresponding display mode of the display terminal that are transmitted by the remote control device;

wherein if the display mode is determined by a multi-point control server connected to a telepresence system through a transport network according to the entire caption content and the attribute information corresponding to the caption content, the display terminal is configured to: acquire the entire caption content and the corresponding display mode of the display terminal transmitted by the multi-point control server.

9. A system for caption transmission for telepresence, comprising:

at least two display terminals; and a control device, which comprises a multi-point control server connected to a telepresence system through a transport network, configured to:

acquire entire caption content and attribute information corresponding to the caption content input by a user by using a service system, or acquire the entire caption content and the attribute information corresponding to the caption content that are transmitted by a local terminal or a remote terminal, determine, according to the entire caption content and the attribute information corresponding to the caption content, a display timing and caption content to be displayed on each the at least two display terminals, and transmit the determined caption content to each of the two display terminals according to the display timing;

wherein the at least two display terminals are configured to receive the caption content and superpose the determined caption content to an image, and wherein each of the two display terminals is a remote terminal.

10. The system according to claim 9, wherein the control device is configured to:

acquire the entire caption content and the attribute information corresponding to the caption content input by the user, and transmit the determined caption content to the remote terminal according to the display timing by using a local terminal.

11. A system for caption transmission for telepresence, comprising:

a control device, configured to:

determine, according to entire caption content and attribute information corresponding to the caption content, a display timing and caption content to be displayed on each display terminal in a conference, and transmit the entire caption content and a display mode to each display terminal; and at least two display terminals, wherein each display terminal is configured to:

acquire the entire caption content and a corresponding display mode of the display terminal, determine a display timing and caption content to be displayed on the display terminal according to the display mode and the entire caption content, and superpose the determined caption content to an image according to the display timing;

wherein if the control device is a local control device:

each display terminal is configured to receive the entire caption content and the corresponding display mode of the display terminal that are transmitted by the local control device; and the entire caption content and the attribute information corresponding to the caption content are (i) directly input by a user to the local control device or (ii) transmitted by a remote control device to the local control device;

wherein if the control device is a remote control device:
the display terminal is configured to acquire the entire caption content and the corresponding display mode of the display terminal that are transmitted by the remote control device;

wherein if the control device is a multi-point control server connected to a telepresence system through a transport network:
each display terminal is configured to acquire the entire caption content and the corresponding display mode of the display terminal transmitted by the multi-point control server; and
the entire caption content and the attribute information corresponding to the caption content are (i) input by a user by using a service system, or (ii) transmitted by the user by using a local terminal or a remote terminal.

\* \* \* \* \*